US012783627B2

(12) United States Patent
Alameh et al.

(10) Patent No.: US 12,783,627 B2
(45) Date of Patent: Nov. 3, 2026

(54) SYSTEM AND METHOD FOR A WEARABLE THREE-DIMENSIONAL INPUT/OUTPUT (IO) AND AUTHENTICATOR DEVICE ACTING AS SECURITY AND IO DEVICE FOR INFORMATION HANDLING SYSTEMS WITHIN DETECTED RANGE

(71) Applicant: Dell Products LP, Round Rock, TX (US)

(72) Inventors: Rachid M. Alameh, Crystal Lake, IL (US); Jarrett Simerson, Northbrook, IL (US); Gerald Rene Pelissier, Santa Clara, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 87 days.

(21) Appl. No.: 19/038,828

(22) Filed: Jan. 28, 2025

(65) Prior Publication Data

US 2026/0220243 A1 Jul. 30, 2026

(51) Int. Cl.
*G06F 21/34* (2013.01)

(52) U.S. Cl.
CPC .................................... *G06F 21/34* (2013.01)

(58) Field of Classification Search
CPC ....................................................... G06F 21/34
See application file for complete search history.

(56) References Cited

U.S. PATENT DOCUMENTS 10,191,543 B2 * 1/2019 Priyantha ................ G06F 1/163
10,515,255 B2 12/2019 Strohmann
11,733,790 B2 * 8/2023 Beyhs .................. G06F 3/0362 345/184
2014/0285416 A1 * 9/2014 Priyantha ............... G06F 3/014 345/156

(Continued)

FOREIGN PATENT DOCUMENTS

WO 2018/030887 A1 2/2018

OTHER PUBLICATIONS

J. Gummeson, et al., "An Energy Harvesting Wearable Ring Platform for Gesture Input on Surfaces," 14 pages, Jun. 2014.

*Primary Examiner* — Farid Homayounmehr
*Assistant Examiner* — Suman Debnath
(74) *Attorney, Agent, or Firm* — Prol Intellectual Property Law, PLLC; H. Kenneth Prol

(57) ABSTRACT

A wearable three-dimensional (3D) input/output (IO) and authenticator ring device comprising a ringed structure and interface platform curved for placement around a user's finger having a curved-surface high-sensitivity fingerprint and touchpad sensor configured to face a user's thumb for interaction and a user presence detector to determine that the user has donned the wearable 3D IO and authenticator ring device. The wearable 3D IO and authenticator ring device to operatively pair with an information handling system and one or more smart devices when located within a user-defined range to establish the wearable 3D IO and authenticator ring device as a controlling input device. The wear- (Continued)

able 3D IO and authenticator ring device to tune user inputs with artificial intelligence and to detect and wirelessly transmit touch inputs, user hand movement inputs, gesture inputs, or finger press inputs correlating to input commands for the information handling system or smart devices.

20 Claims, 5 Drawing Sheets

(56) References Cited

U.S. PATENT DOCUMENTS

| | | | | |
|---|---|---|---|---|
| 2015/0062086 | A1* | 3/2015 | Nattukallingal | G06F 3/016<br>345/175 |
| 2015/0277559 | A1 | 10/2015 | Vescovi | |
| 2018/0276440 | A1 | 9/2018 | Strohmann | |
| 2019/0391645 | A1 | 12/2019 | Vescovi | |
| 2020/0241641 | A1 | 7/2020 | Vescovi | |
| 2022/0091683 | A1 | 3/2022 | Beyhs | |
| 2023/0143293 | A1 | 5/2023 | Sanchez | |
| 2024/0063837 | A1* | 2/2024 | Grétarsson | H04B 1/385 |
| 2024/0146350 | A1 | 5/2024 | Grétarsson | |

* cited by examiner

SYSTEM AND METHOD FOR A WEARABLE THREE-DIMENSIONAL INPUT/OUTPUT (IO) AND AUTHENTICATOR DEVICE ACTING AS SECURITY AND IO DEVICE FOR INFORMATION HANDLING SYSTEMS WITHIN DETECTED RANGE

FIELD OF THE DISCLOSURE

The present disclosure generally relates to wireless input/output (IO) devices for information handling systems and smart devices. The present disclosure more specifically relates to a wearable three-dimensional (3D) IO and authenticator device for automatically authorizing a user and providing IO commands to a paired information handling system or smart device when the user wearing the wearable 3D IO and authenticator ring device comes within a user-defined range of the information handling system or smart device.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may execute machine readable code instructions of one or more software applications that may include interaction capabilities via one or more IO devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
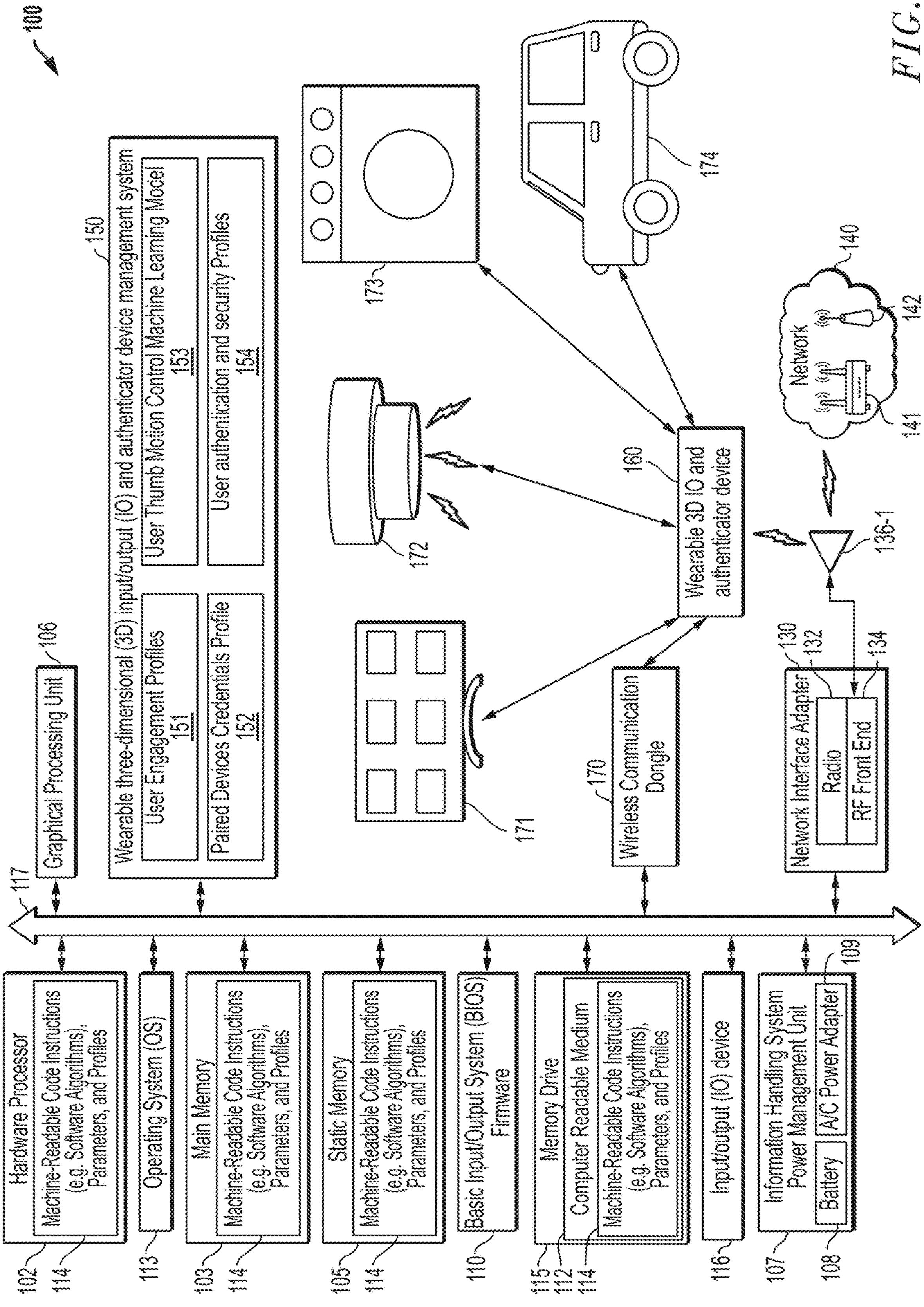
FIG. 1 is a block diagram illustrating an information handling system operatively coupled to a wearable three-dimensional (3D) input/output (IO) and authenticator ring device for managing access by the wearable 3D IO and authenticator ring device to the information handling system or other smart devices according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Users of information handling systems often employ multiple input/output (IO) devices to control their computers, smart devices, Internet of Things (IOT) devices, and smart appliances. For example, users may use a mouse for information handling systems such as computers, various remotes for smart devices such as smart televisions (TVs), or software applications on smart phones to control IOT sensors and appliances such as thermostats, smoke detectors, or washing machines. Further, some users may interact with a software application on their smart phones or within a graphical user interface (GUI) of their personal vehicles to operate various functionalities of those vehicles, including, for example, audio settings and media playback. This results in the user having to interact with several different IO devices (e.g., mouse, remote controls) and multiple software applications as the user goes about their day. The wearable 3D IO and authenticator ring device in embodiments of the present disclosure is a single device that travels with the user to act as a primary IO device for interacting with all of a user's various smart devices and information handling systems as the user wearing the device comes within range of those various smart devices and information handling systems throughout the day.

The wearable 3D IO and authenticator ring device in embodiments of the present disclosure may be worn as a ring on a user's finger, with a fingerprint and touch sensor pad situated toward the user's thumb for receiving user input. For example, such a wearable 3D IO and authenticator ring device may allow a user to authenticate themselves using a high resolution fingerprint and touch sensor pad unit and include one or more biometric sensors embedded within the ring architecture, such as electromyography (EMG) measurement unit that senses muscle movement in the user's finger or a user capacitive or thermal wearability sensor that senses when the user is currently wearing the device. In addition, the wearable 3D IO and authenticator ring device in embodiments of the present disclosure may incorporate a finger press sensor that detects when the user has pressed a thumb down against the device to register a mouse click or a button or keystroke selection, for example. The wearable 3D IO and authenticator ring device may provide three-dimensional movement input for a cursor, for example, to a paired information handling system or smart device based on readings of the high resolution fingerprint and touch sensor pad unit operating as a touchpad to detect a thumb or another finger or from movement of the wearable 3D IO and authenticator ring device on the hand or elevation or movement position sensing from a gyro inertial measurement unit within the wearable 3D IO and authenticator ring device. An inductive coil in the ring structure may be used for inductive charging. A global positioning (GPS) unit may be included in the wearable 3D IO and authenticator ring device for location contextual information such as secure or public location identification. A microphone may additionally be incorporated within the wearable 3D IO and authenticator ring device for user voice command input or voice recognition.

The wearable 3D IO and authenticator ring device may initially pair with at least one information handling system having a hardware processor executing machine readable code instructions for a wearable 3D IO and authenticator ring device management system to set various rules, policies, or profiles for the ways in which the wearable 3D IO and authenticator ring device may interact with various information handling systems or smart devices. For example, following an initial pairing between at least one information handling system, at least one smart device, and the wearable 3D IO and authenticator ring device, the hardware processor of the information handling system may execute code instructions of the wearable 3D IO and authenticator ring device management system to generate a user engagement profile for the paired smart device or for the information handling system itself. This user engagement profile may be based on user input received via a graphical user interface (GUI) of the information handling system, to correlate one or more outputs of sensors of the wearable 3D IO and authenticator ring device with one or more input commands for the paired smart device or for the information handling system. For example, the user engagement profile for the information handling system itself or for a paired smart device may define a user pressing down on a curved-surface fingerprint sensor of the wearable 3D IO and authenticator ring device as a mouse click, movement of the wearable 3D IO and authenticator ring device as movement of a cursor in 3D space, or swiping of a thumb across the curved-surface fingerprint sensor operating as a touchpad as a cursor control or scroll command.

As another example, the hardware processor of the information handling system may execute code instructions of the wearable 3D IO and authenticator ring device management system to generate a paired devices credentials profile for the smart device or for the information handling system itself. Such a paired devices credentials profile for the smart device or for the information handling system may be based on user input received via the information handling system GUI to identify the smart device or information handling system or smart device type being engaged with (e.g., a laptop computer, a car, a television, an appliance, etc.) and define a distance from the smart device or information handling system at which the user wishes the wearable 3D IO and authenticator ring device to become a controlling input device for the smart device or information handling system. For example, the paired devices credentials profile may set a distance of five feet as a range within which the wearable 3D IO and authenticator ring device may automatically become the primary or controlling IO mouse for an information handling system. As another example, the paired devices credentials profile may set a distance of twenty feet as a range within which the wearable 3D IO and authenticator ring device may automatically become the primary or controlling remote control for a smart television (TV). In yet another example, the paired devices credentials profile may set a distance of fifteen feet as a range within which the wearable 3D IO and authenticator ring device may automatically become the primary or controlling IO device for an IOT sensor. As yet another example, the paired devices credentials profile may set a distance of three feet as a range within which the wearable 3D IO and authenticator ring device may automatically become the primary or controlling IO device for a smart appliance, such as a smart washing machine. In still another example, the paired devices credentials profile may set a distance of one hundred feet as a range within which the wearable 3D IO and authenticator ring device may automatically become the primary or controlling IO device for a personal vehicle, such as a car. Range may be determined at the wearable 3D IO and authenticator ring device via a range finder, microphone, a beacon transmitted from wireless interface device of the wearable 3D IO and authenticator ring device or from the information handling system or smart device or from a dongle attached to the same or other systems. For example, the wireless interface device may determine range via a beacon or pairing request transmission from the wearable 3D IO and authenticator ring device or an acknowledgement based on a reflected signal. In another example embodiment, a wireless Wi-Fi or other radio protocol location system may determine range distance between the wearable 3D IO and authenticator ring device and an information handling system or smart device. In another embodiment, received signal strength indicator value (RSSI) is used to determine when wearable 3D IO and authenticator ring device is in proximity of a smart device or the information handling system. In yet another embodiment, ultra-wide band sensing technology is used to determine range between the wearable 3D IO and authenticator ring device and smart devices or an information handling system.

The hardware processor of the information handling system may also execute code instructions of the wearable 3D IO and authenticator ring device management system to generate a user authentication and security profile for the paired smart device or information handling system. Such a paired devices credentials profile for the smart device or for the information handling system may be based on user input received via the information handling system GUI to define rules of automatic login, virtual private network (VPN) access, or content access to the information handling system or paired smart device via the wearable 3D IO and authenticator ring device when in range and when out of range. For example, the user authentication and security profile may set the wearable 3D IO and authenticator ring device to automatically login in administrator mode or for VPN access when within range of the information handling system or smart device (as defined within the paired devices credentials profile) by automatically transmitting any needed user credentials from the wearable 3D IO and authenticator ring device to the information handling system or smart device upon the wearable 3D IO and authenticator ring device authenticating the user through various onboard sensors and upon the wearable 3D IO and authenticator ring device coming within the user-defined range of the information handling system or smart device. As another example, the user authentication and security profile may define specific secure content stored on the information handling system or smart device that may only be viewed when the wearable 3D IO and authenticator ring device has authenticated the user through various onboard sensors and upon the wearable 3D IO and authenticator ring device coming within the user-defined range of the information handling system or smart device. In embodiments herein, the information handling system or smart device may log the user out, cease access to a VPN, or lock access to secure content when the wearable 3D IO and authenticator ring device is no longer detected within the user-defined range of the information handling system or smart device. Further, in some embodiments, the security limitations for automatic log out or block accesses at the information handling system or smart device when the GPU unit determines that a GPS location indicates a location of potential risk to security.

These profiles may be generated at the information handling system and transmitted to a wearable 3D IO and authenticator ring device agent operating at the wearable 3D IO and authenticator ring device. A hardware microprocessor at the wearable 3D IO and authenticator ring device may then execute machine readable code instructions of this wearable 3D IO and authenticator ring device agent to manage interoperability between the wearable 3D IO and authenticator ring device and previously paired smart devices or the information handling system itself as the user moves within range of these devices in the future. In such a way, the user of the wearable 3D IO and authenticator ring device may move the wearable 3D IO and authenticator ring device between and among various smart devices and information handling systems, and automatically establish the 3D IO and authenticator device as a security and IO device for those various smart devices and information handling systems as the user enters and leaves the ranges of those devices.

Turning now to the figures, FIG. 1 illustrates an information handling system 100 similar to the information handling systems according to several aspects of the present disclosure. As described herein, users of information handling systems, such as 100, often employ multiple input/output (IO) devices 116 to control their computers, smart devices 171, Internet of Things (IOT) devices 172, smart appliances 173, or vehicles 174. For example, users may use a mouse for information handling systems 100 such as computers, various remotes for smart devices 171 such as smart televisions (TVs), or software applications on smart phones to control IOT sensors 172 such as thermostats, smoke detectors, security system sensors, and appliances 173 such as washing machines, or vehicles 174. Further, some users may interact with a software application on their smart phones or within a graphical user interface (GUI) of their personal vehicles 174 to operate various functionalities of those vehicles 174, including, for example, audio settings and media playback. This results in the user having to interact with several different IO devices (e.g., mouse, remote controls) and multiple software applications as the user goes about their day. The wearable 3D IO and authenticator ring device 160 in an embodiment is a single device that travels with the user to act as a primary IO device for interacting with all of a user's various smart devices 171, 172, 173, or 174 and information handling systems 100 as the user wearing the device 160 comes within range of those various smart devices 171, 172, 173, or 174 and information handling systems 100 throughout the day.

The wearable 3D IO and authenticator ring device 160 may be a ring structure with an interface surface platform for a high-sensitivity fingerprint and touch sensor pad unit that has a dual use operation as a fingerprint sensor and as a sensitive touch pad. When the high-sensitivity fingerprint and touch sensor pad unit is touched it can authenticate the user via fingerprint identification as well as allow for finger control using capacitive touch as a touchpad with the same surface. In another embodiment, high-sensitivity fingerprint and touch sensor pad unit may include separate fingerprint sensor device and touchpad device placed side by side. wearable 3D IO and authenticator ring device 160 includes other sensors and hardware components as discussed below with respect to FIG. 2. The wearable 3D IO and authenticator ring device 160 in an embodiment may initially pair with the information handling system 100 having a hardware processor 102 executing machine readable code instructions for a wearable 3D IO and authenticator ring device management system 150 to set various rules, policies, or profiles for the ways in which the wearable 3D IO and authenticator ring device 160 may interact with various information handling systems 100 or smart devices 171, 172, 173, or 174. Such an initial pairing may be performed via a wireless link between the wearable 3D IO and authenticator ring device 160 and either the wireless interface adapter 130 or an operably connected wireless communication dongle 170 in various embodiments herein. The user of the wearable 3D IO and authenticator ring device 160 in an embodiment may interact with the wearable 3D IO and authenticator ring device management system 150, for example via a graphical user interface (GUI) of the information handling system 100, to set a user engagement profile 151, a paired devices credentials profile 152, and a user authentication and security profile 153.

The user engagement profile 151 in an embodiment may correlate one or more outputs of sensors of the wearable 3D IO and authenticator ring device 160 with one or more input commands for the paired smart device 171, 172, 173, or 174 or for the information handling system 100. In an embodiment, the user authentication and security profile 153 may define rules of automatic login, virtual private network (VPN) access, or content access to the information handling system 100 or the paired smart device 171, 172, 173, or 174 via the wearable 3D IO and authenticator ring device 160 when in range and when out of range of the smart device 171, 172, 173, or 174 or the information handling system 100, as described in greater detail below with respect to FIGS. 2, 4, and 5.

The paired devices credentials profile 152 may identify the type of smart device 171, 172, 173, or 174 and define a distance from the smart device 171, 172, 173, or 174 at which the user wishes the wearable 3D IO and authenticator ring device 160 to become a controlling input device for the smart device 171, 172, 173, or 174, or for the information handling system 100. For example, the paired devices credentials profile 152 may set a distance of five feet as a range within which the wearable 3D IO and authenticator ring device 160 may automatically become the primary or controlling IO mouse for an information handling system 100. As another example, the paired devices credentials profile

152 may set a distance of twenty feet as a range within which the wearable 3D IO and authenticator ring device 160 may automatically become the primary or controlling remote control for a smart television (TV) 271. In yet another example, the paired devices credentials profile 152 may set a distance of fifteen feet as a range within which the wearable 3D IO and authenticator ring device 160 may automatically become the primary or controlling IO device for an IOT sensor 172. As yet another example, the paired devices credentials profile 152 may set a distance of three feet as a range within which the wearable 3D IO and authenticator ring device 160 may automatically become the primary or controlling IO device for a smart appliance 173, such as a smart washing machine. In still another example, the paired devices credentials profile 152 may set a distance of one hundred feet as a range within which the wearable 3D IO and authenticator ring device 160 may automatically become the primary or controlling IO device for a personal vehicle 174, such as a car. These are only examples user-defined ranges and it is contemplated that the user may set any distance within the range of a wireless radio for the wearable 3D IO and authenticator ring device 160 to act as a primary IO device for any previously paired information handling system 100 or smart device 171, 172, 173, or 174. Range may be determined at the wearable 3D IO and authenticator ring device 160 via an IO device 116 at the information handling system 100 such as a range finder, camera or a microphone in various embodiments to detect a location of the wearable 3D IO and authenticator ring device 160 or the user. In another embodiment, the wireless interface device 190 may determine range via a beacon or pairing request transmission to the wearable 3D IO and authenticator ring device or an acknowledgement thereto based on a reflected signal from the wearable 3D IO and authenticator ring device. In another example embodiment, a wireless Wi-Fi or other radio protocol location system may determine range distance at the wireless interface device 190 between the wearable 3D IO and authenticator ring device 160 and an information handling system 100 or smart device 171, 172, 173, or 174. In yet other embodiments, an RSSI may be used at the wireless interface device 190 of the information handling system 100 or smart device 171, 172, 173, or 174 or at the wearable 3D IO and authenticator ring device 160 to determine range. Other embodiments described may also be used.

The hardware processor 102 may also execute machine readable code instructions 114 of the wearable 3D IO and authenticator ring device management system 150 to generate a user thumb motion control machine learning model 153 that adjusts the input commands for the information handling system 100 or previously paired smart devices identified within the user engagement profile 151 based on specific characteristics of a single user's movement or interaction with the various sensors of the wearable 3D IO and authenticator ring device 160. For example, some individual users may press the fingerprint sensor with greater force than others, swipe smaller distance, or utilize smaller finger displacement than others, or perform more forceful or rapid gestures or hand movements than others which may correlate to movement of a cursor. The user thumb motion control machine learning model 153 in an embodiment may be trained at the information handling system 100, based on sensor readings taken at the wearable 3D IO and authenticator ring device 160 and transmitted to the information handling system 100 in order to adjust the input commands for the information handling system 100 or previously paired smart devices identified within the user engagement profile 151 based on specific characteristics of a single user's movement or interaction with the various sensors of the wearable 3D IO and authenticator ring device 160. Upon completion of such training, the information handling system 100 in an embodiment may transmit a trained user thumb motion control machine learning model to the wearable 3D IO and authenticator ring device 160 in the form of weight matrices for a multi-layer neural network, for example.

Upon completion of the initial pairing, setting of the profiles 151, 152, 154, and training of the machine learning model 153, the wearable 3D IO and authenticator ring device may begin to scan for previously paired smart devices or information handling systems with which to engage. For example, in one embodiment, smart devices 171, 172, 173, or 174, or information handling system 100 may routinely transmit via WLAN a service set identifier (SSID) identifying itself to the wearable 3D IO and authenticator ring device 160. In another example embodiment, the wearable 3D IO and authenticator ring device 160 may routinely transmit a unique radio frequency (RF) beacon, and receive an acknowledgment response (ACK) from nearby previously paired devices 100, 171, 172, 173, or 174, as transmitted via radio 232 or via an operably coupled wireless communication dongle 170, which may include dongles for smart TVs such as an Amazon® Firestick® or Roku® dongle. The specific method used may in some embodiments be set by the user within the paired devices credentials profile 152.

User authorization credentials for accessing the information handling system 100 or smart devices 171, 172, 173, or 174 in an embodiment may be transmitted within a periodically transmitted beacon (either from the information handling system 100, smart devices 171, 172, 173, or 174, or from the wearable 3D IO and authenticator ring device 160), or may be transmitted as a response to such a beacon. In some cases, the user authorization credentials may only be transmitted upon confirmation that the information handling system 100 or smart devices 171, 172, 173, or 174 are identified within a previously stored paired devices credentials profile 152 for a previously paired smart device 171, 172, 173, or 174 or information handling system 100. In another aspect of an embodiment, the beacon or acknowledgment transmitted from the smart device 171, 172, 173, or 174 or information handling system 100 to the wearable 3D IO and authenticator ring device 160 may identify the device type (e.g., smart TV, IOT sensor, smart appliance, vehicle, computer) using a multi-digit code that correlates to a device type code stored within the paired devices credentials profile 152 associated with that device.

In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 141, a base station transceiver 142, a wireless telephone, a control system, a camera, a scanner, a printer, a personal trusted device, a smart appliance, an IOT sensor, a vehicle, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of computer readable code instructions to perform one or more computer functions, via one or more hardware processing resources.

The information handling system 100 may include main memory 103, (volatile (e.g., random-access memory, etc.), or static memory 105, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, other hardware controllers, or any combination thereof. Additional components of the information handling system 100 may include one or more storage devices such as static memory 105 or drive unit 115. The information handling system 100 may include or interface with one or more communications ports for communicating with external devices, as well as an input/output (IO) device 116, a video/graphics digital display device, or any combination thereof. Portions of an information handling system 100 may themselves be considered information handling systems 100.

Information handling system 100 may include devices or modules that embody one or more of the hardware devices or hardware processing resources executing machine readable code instructions for one or more systems and modules. The information handling system 100 may execute machine readable code instructions (e.g., software or firmware algorithms), parameters, and profiles 114 that may operate on servers or systems, remote data centers, or on-box in individual client information handling systems according to various embodiments herein. In some embodiments, it is understood that any or all portions of machine readable code instructions (e.g., software or firmware algorithms), parameters, and profiles 114 may operate on a plurality of information handling systems 100.

The information handling system 100 may include the hardware processor 102 such as a central processing unit (CPU) or other hardware processing resources. Any of the hardware processing resources may operate to execute machine readable code instructions 114 that are either firmware or software code. Moreover, the information handling system 100 may include memory such as main memory 103, static memory 105, and disk drive unit 115 (volatile (e.g., random-access memory, etc.), nonvolatile memory (read-only memory, flash memory etc.) or any combination thereof or other memory with computer readable medium 112 storing machine readable code instructions (e.g., software or firmware algorithms), parameters, and profiles 114 executable by the hardware processor 102, EC 104, GPU 106, or any other hardware processing device. The information handling system 100 may also include one or more buses 117 operable to transmit communications between the various hardware components such as any combination of various I/O devices 116, as well as between hardware processors 102, an EC 104, GPU 106 or other, the operating system (OS) 113, the basic input/output system (BIOS) 110, the wireless interface adapter 130, or a radio module 132, among other components described herein. In an embodiment, the hardware processor 102, EC 104, and/or GPU 106 may execute one or more bus drivers in order to transmit this data between the information handling system 100 and the input/output devices 116 described herein. Input/output devices 116 may include any type of IO device, such as a microphone, camera, digital display device, battery, mouse, keyboard, headset, or thumb drive, for example.

A network interface device of the information handling system 100 may be wired or wireless such as shown with wireless interface adapter 130 that can provide wireless connectivity among devices such as with Bluetooth® or to a network 140, e.g., a wide area network (WAN), a local area network (LAN), wireless local area network (WLAN), a wireless personal area network (WPAN), a wireless wide area network (WWAN), a virtual private network (VPN) or other network. In embodiments described herein, the wireless interface device 130 with its radio 132, RF front end 134 and antenna 136-1 is used to communicate with the network 140 and with the wearable 3D IO and authenticator ring device 160, via, for example, a Bluetooth® or Bluetooth® Low Energy (BLE) protocols, or other WPAN or WLAN protocols.

In an embodiment, a WAN, WWAN, LAN, and WLAN may each include an AP 141 or base station 142 used to operatively couple the information handling system 100 to a network 140 or the wearable 3D IO and authenticator ring device 160 via a wireless interface adapter 130. In a specific embodiment, the network 140 may include macro-cellular connections via one or more base stations 142 or a wireless AP 141 (e.g., Wi-Fi), or such as through licensed or unlicensed WWAN small cell base stations 142. Connectivity may be via wired or wireless connection. For example, the wearable 3D IO and authenticator ring device 160, wireless network wireless APs 141 or base stations 142 may be operatively connected to the information handling system 100. Wireless interface adapter 130 may include one or more radio frequency (RF) subsystems (e.g., radio 132) with transmitter/receiver circuitry, modem circuitry, one or more antenna RF front end circuits 134, one or more wireless controller circuits, amplifiers, antennas 136-1 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WiMAX, WWAN such as 3GPP or 3GPP2, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHz, or 6 GHz bands which may be shared communication frequency bands with WWAN protocols or Bluetooth® protocols in some embodiments. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, one or more hardware processors or hardware controllers executing software, firmware, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software machine readable code instructions executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 140 may communicate voice, video, or data over the network 140. Further, the machine readable code instructions 114 may be transmitted or received over the network 140 via the network interface device or wireless interface adapter 130.

The information handling system 100 may include a set of instructions 114 that may be executed to cause the computer system to perform any one or more of the methods or computer-based functions disclosed herein. For example, machine readable code instructions 114 may be executed by a hardware processor 102, GPU 106, EC 104, or any other hardware processing resource and may include software agents, or other aspects or components used to execute the methods and systems described herein. Various software modules comprising application machine readable code instructions 114 may be coordinated by an OS 113, and/or via an application programming interface (API) include a unified device API described herein. An example OS 113 may include Windows®, Android®, and other OS types. Example APIs may include Win 32, Core Java API, or Android APIs.

In an embodiment, the information handling system 100 may include a disk drive unit 115. The disk drive unit 115 and may include machine-readable code instructions, parameters, and profiles 114 in which one or more sets of machine-readable code instructions, parameters, and profiles 114, such as firmware or software can be embedded to be executed by the hardware processor 102 or other hardware processing devices such as a GPU 106 or EC 104, or other microcontroller unit to perform the processes described herein. Similarly, main memory 103 and static memory 105 may also contain a computer-readable medium for storage of one or more sets of machine-readable code instructions, parameters, or profiles 114 described herein. The disk drive unit 115 or static memory 105 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 103, the static memory 105, and/or within the disk drive 115 during execution by the hardware processor 102, EC 104, GPU 106 of information handling system 100.

Main memory 103 or other memory of the embodiments described herein may contain computer-readable medium (not shown), such as RAM in an example embodiment. An example of main memory 103 includes random access memory (RAM) such as static RAM (SRAM), dynamic RAM (DRAM), non-volatile RAM (NV-RAM), or the like, read only memory (ROM), another type of memory, or a combination thereof. Static memory 105 may contain computer-readable medium (not shown), such as NOR or NAND flash memory in some example embodiments. The applications and associated APIs, for example, may be stored in static memory 105 or on the disk drive unit 115 that may include access to a machine-readable code instructions, parameters, and profiles 114, such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 107 (a.k.a. a power supply unit (PSU)). The PMU 107 may include a hardware controller and executable machine-readable code instructions to manage the power provided to the components of the information handling system 100 such as the hardware processor 102 and other hardware components described herein. The PMU 107 may control power to one or more components including the one or more drive units 115, the hardware processor 102 (e.g., CPU), the EC 104, the GPU 106, the wireless communication dongle 170, or other components that may require power when a power button has been actuated by a user. In an embodiment, the PMU 107 may monitor power levels and be electrically coupled to the information handling system 100 to provide this power. The PMU 107 may be coupled to the bus 117 to provide or receive data or machine-readable code instructions. The PMU 107 may regulate power from a power source such as the battery 108 or AC power adapter 109. In an embodiment, the battery 108 may be charged via the AC power adapter 109 and provide power to the components of the information handling system 100, via wired connections as applicable, or when AC power from the AC power adapter 109 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 112 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system 100. The system, device, controller, or module can also include a combination of the foregoing examples of hardware or hardware executing software or firmware. Note that an information handling system 100 can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
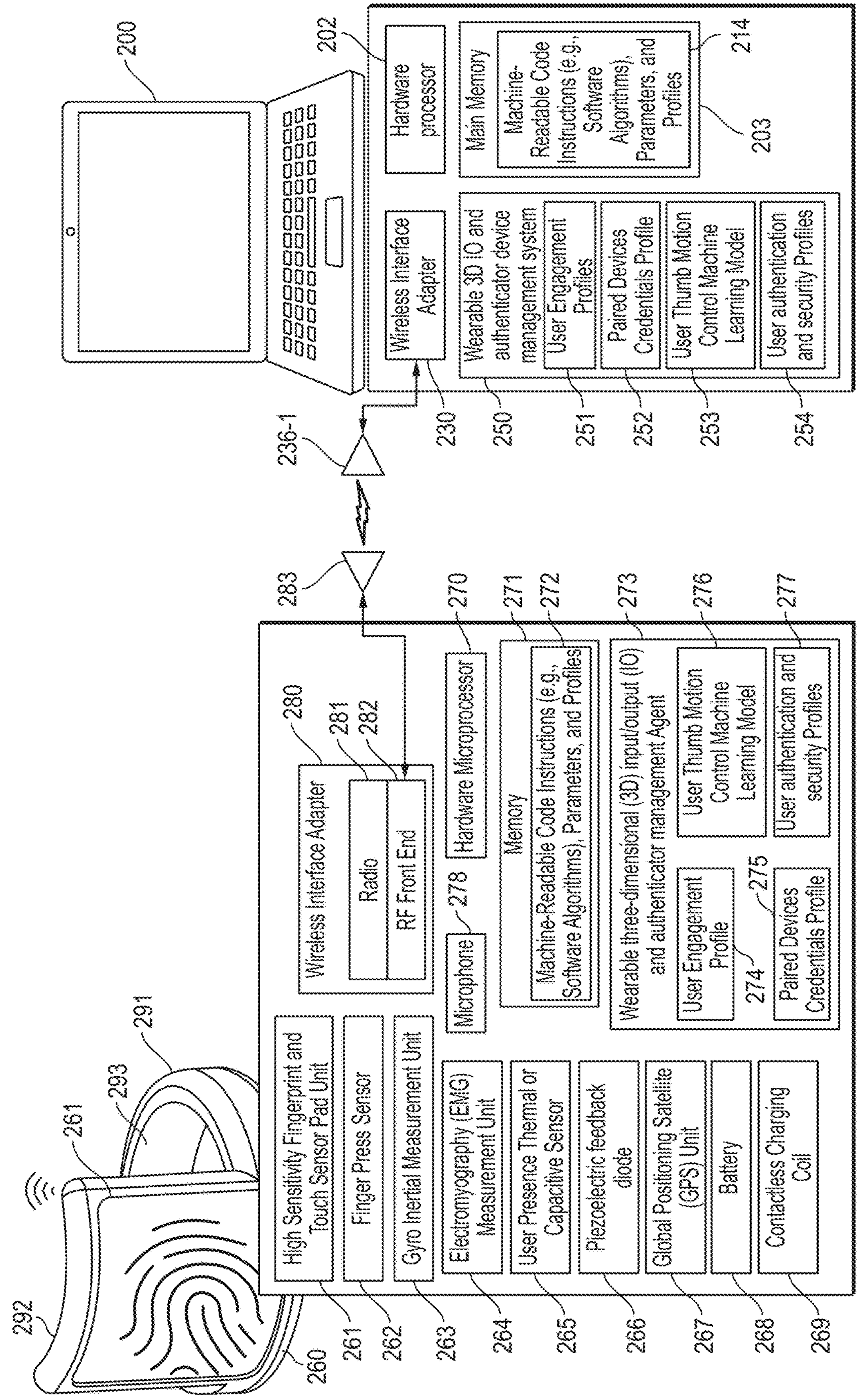
FIG. 2 is a block diagram illustrating a wearable 3D IO and authenticator ring device acting as a security and primary IO device for an information handling system according to an embodiment of the present disclosure.

FIG. 2 is a block diagram illustrating a wearable 3D IO and authenticator ring device acting as a security and primary IO device for an information handling system within a user-defined range of the wearable 3D IO and authenticator ring device according to an embodiment of the present disclosure. As described herein, the wearable 3D IO and authenticator ring device 260 in an embodiment is a single device that travels with the user to act as a primary IO device that may be worn as a ring for interacting with all of a user's various smart devices and information handling systems 200. As the user wearing the wearable 3D IO and authenticator ring device 260 comes within range of those various smart devices and information handling systems 200 throughout the day it may pair and engage with those various smart devices and information handling systems.

The wearable 3D IO and authenticator ring device 260 in an embodiment has a ring structure 291 with an interface surface platform 292 for a high-sensitivity fingerprint and touch sensor pad unit 261 that operates as a fingerprint sensor as well as a touchpad with the same surface and includes other sensors and hardware components according to embodiments herein. In other embodiments, the fingerprint and touch sensor pad unit 261 may be a co-located fingerprint sensor and a touchpad sensor. In an example embodiment, the interface surface platform 292 with the high-sensitivity fingerprint and touch sensor pad unit 261 or as collocated fingerprint sensor and touchpad devices may have a curved surface to conform to the ring structure 291 that is wearable on a user's finger. In one example embodiment, a low-power curved FPS-Goodix sensor that is capacitive or ultrasonic ultrathin complementary metal-oxide semiconductor (CMOS) device may be installed as the high-sensitivity fingerprint and touch sensor pad unit 261 on the interface surface platform 292. In another embodiment, the high-sensitivity fingerprint and touch sensor pad unit 261 may be flat on the ring structure 291 of the wearable 3D IO and authenticator ring device 260. Further, a flex printed circuit board may be used to mount hardware including the hardware microprocessor 271, wireless interface adapter 280, memory 271, gyro inertial measurement unit 263, and other hardware in embodiments herein. The wearable 3D IO and authenticator ring device 260 further includes a skin interface surface 293 within the ring structure 291 having additional sensors, such as a user presence thermal or capacitive sensor 265 under the skin interface surface 293 in an embodiment. The wearable 3D IO and authenticator ring device 260 in an embodiment may be worn as a ring with the ring structure 291 on a user's finger, with a high sensitivity fingerprint and touch sensor pad unit 261 situated toward the user's thumb or another finger for receiving user input, such as for cursor movement or other joystick type movement or scroll input, as described in greater detail below with respect to FIGS. 3A and 3B.

For example, such a wearable 3D IO and authenticator ring device 260 may allow a user to authenticate themselves using the high resolution fingerprint and touch sensor pad unit 261 and one or more biometric hardware sensors embedded within the ring structure 291 architecture, such as electromyography (EMG) measurement unit 264 that senses muscle movement in the user's finger, or a user presence thermal or capacitive sensor 265 that senses when the user is currently wearing the wearable 3D IO and authenticator ring device 260. The high resolution fingerprint and touch sensor pad unit 261 may further provide biometric authentication of a user wearing the wearable 3D IO and authenticator ring device 260 such as via a finger or thumbprint authentication in some embodiments. In addition, the wearable 3D IO and authenticator ring device 260 in an embodiment may incorporate a finger press sensor 262 that detects when the user has pressed a thumb down against the wearable 3D IO and authenticator ring device 260, such as on the interface surface platform 292, to register a mouse click, for example. The finger press sensor 262 may be a resistive or piezo force sensor under the high resolution fingerprint and touch sensor pad unit 261 in an embodiment. The piezo force sensor also operate as or another piezo device may be installed wearable 3D IO and authenticator ring device 260 to provide haptic feedback to the user. In another embodiment, the press sensor may be enabled in software by assessing the finger contact area input on the high sensitivity fingerprint and touch sensor pad unit 261 such that a large contact area indicates high press level for a press input. The size of the contact area may be machine learned in some embodiments for particular users of the high sensitivity fingerprint and touch sensor pad unit 261. The wearable 3D IO and authenticator ring device 260 may additionally provide three-dimensional movement input for a cursor, for example, to a paired information handling system 200 or smart device based on readings of an incorporated gyro inertial measurement unit 263 within the wearable 3D IO and authenticator ring device 260 to detect elevation or motion changes of a gesture. A microphone 278 may additionally be incorporated within the wearable 3D IO and authenticator ring device 260 for user voice command input or authentication. Further, a GPS unit 267 may be included in the wearable 3D IO and authenticator ring device 260 for contextual information about location of the wearable 3D IO and authenticator ring device 260 such as within secure or non-secure locations for authentication and security applications.

The wearable 3D IO and authenticator ring device 260 may include a hardware microprocessor 270 for executing machine-readable code instructions 272, such as machine readable code instructions for the wearable 3D IO and authenticator ring device management agent 273, as stored within a memory 271. In an embodiment, the wearable 3D IO and authenticator ring device 260 may include the hardware microprocessor 270 or other hardware processing resources on the wearable 3D IO and authenticator ring device 260. Any of the hardware processing resources may operate to execute machine readable code instructions 272 that are either firmware or software code, such as machine readable code instructions for the wearable 3D IO and authenticator ring device management agent 273. The wearable 3D IO and authenticator ring device 260 may include a set of instructions 272 that may be executed to cause the wearable 3D IO and authenticator ring device 260, in coordination with an operatively coupled information handling system 200 or other smart device in wireless communication, to perform any one or more of the methods or computer-based functions disclosed herein. For example, machine readable code instructions 272 may be executed by a hardware microprocessor 270 or any other hardware processing resource and may include software agents, or other aspects or components used to execute the methods and systems described herein.

Moreover, the wearable 3D IO and authenticator ring device 260 may include memory 271, such as volatile (e.g., random-access memory, etc.), nonvolatile memory (read-only memory, flash memory etc.) or any combination thereof or other memory with computer readable medium storing machine readable code instructions (e.g., software or firmware algorithms), parameters, and profiles 272 executable by the hardware microprocessor 270 or any other hardware processing device to perform the processes described herein. Memory 271 or other memory of the embodiments described herein may contain computer-readable medium, such as RAM in an example embodiment. In an embodiment, memory 271 may contain computer-readable medium, such as NOR or NAND flash memory in some example embodiments. Another example of memory 271 includes random access memory (RAM) such as static RAM (SRAM), dynamic RAM (DRAM), non-volatile RAM (NV-RAM), or the like, as well as read only memory (ROM), another type of memory, or a combination thereof in other embodiments herein.

In an embodiment, the wearable 3D IO and authenticator ring device 260 may further include a radio 281 and a radio frequency (RF) front end 282. In embodiments described herein, the wearable 3D IO and authenticator ring device 260 with its radio 281, RF front end 282 and antenna 283 is used to communicate with the information handling system 200, via, for example, a Bluetooth® or Bluetooth® Low Energy (BLE) protocols, or other WPAN or WLAN protocols. The wearable 3D IO and authenticator ring device 260 may include one or more radio frequency (RF) subsystems (e.g., radio 281) with transmitter/receiver circuitry, modem circuitry, one or more antenna RF front end circuits 282, one or more wireless controller circuits, amplifiers, antennas 283 and other circuitry of the wireless interface adapter 280 such as one or more antenna ports used for wireless communications via multiple radio access technologies (RATs). The radio 281 may communicate with one or more wireless technology protocols.

The wearable 3D IO and authenticator ring device 260 in an embodiment may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WiMAX, WWAN such as 3GPP or 3GPP2, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHz, or 6 GHz bands which may be shared communication frequency bands with WWAN protocols or Bluetooth® protocols in some embodiments. The wearable 3D IO and authenticator ring device 260 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums.

The wearable 3D IO and authenticator ring device 260 may include a hardware microprocessor 270 for executing machine-readable code instructions 272, such as machine readable code instructions for the wearable 3D IO and authenticator ring device management agent 273, as stored within a memory 271 having computer readable medium. In an embodiment, the wearable 3D IO and authenticator ring device 260 may include the hardware microprocessor 270 such as one or more microcontroller unit (MCU) integrated circuit chips, or other hardware processing resources. Any of the hardware processing resources may operate to execute machine readable code instructions 272 that are either firmware or software code, such as machine readable code instructions 272 for the wearable 3D IO and authenticator ring device management agent 273. The wearable 3D IO and authenticator ring device 260 may include a set of instructions 272 that may be executed to cause the computer system to perform any one or more of the methods or computer-based functions disclosed herein of the wearable 3D IO and authenticator ring device 260. For example, machine readable code instructions 272 may be executed by a hardware microprocessor 270 or any other hardware processing resource and may include software agents, or other aspects or components used to execute the methods and systems described herein. In an embodiment, the wearable 3D IO and authenticator ring device 260 may further include a battery 268, which may be charged via a contactless charging coil 269 embedded within the interior surface of the wearable 3D IO and authenticator ring device 260 ring structure, for placement on an inductive charger. The ring structure 291 may be placed onto a charging post in a charging case with a structure extending through the ring structure 291 and having an inductive charging coil to inductively charge a battery 268 of the wearable 3D IO and authenticator ring device 260 via a contactless charging coil 269 embedded within the interior surface of ring structure 291 in some embodiments. The battery 268 may control power to one or more components including the hardware microprocessor 270, radio 281, RF front end 281, antenna 283, and other components that may require power when a power button, such as finger press sensor 262, has been actuated or a user presence thermal or capacitive sensor 265, indicates the wearable 3D IO and authenticator ring device 260 is put on by a user.

The wearable 3D IO and authenticator ring device 260 may initially pair with at least one information handling system 200 having a hardware processor 202 executing machine readable code instructions 214 for a wearable 3D IO and authenticator ring device management system 250 to set various rules, policies, or profiles for the ways in which the wearable 3D IO and authenticator ring device 260 may interact with various information handling systems 200 or smart devices after initial pairing. For example, following an initial pairing between at least one information handling system 200 or at least one smart device (171, 172, 173, or 174 of FIG. 1) and the wearable 3D IO and authenticator ring device 260, the hardware processor 202 of the information handling system 200 may execute code instructions 214 of the wearable 3D IO and authenticator ring device management system 250 to generate a user engagement profile 251 for the paired smart device or for the paired information handling system 200 itself. This user engagement profile 251 may be based on user input received via a graphical user interface (GUI) of the information handling system 200, to correlate one or more outputs of sensors of the wearable 3D IO and authenticator ring device 260, such as high-sensitivity fingerprint and touch sensor pad unit 261, finger press sensor 262, gyro inertial measurement unit 263, EMG measurement unit 264, GPS unit 267, or microphone 278 with one or more input commands for the paired smart device or for the information handling system 200.

For example, the user engagement profile 251 for the information handling system 200 itself or for a paired smart device may define a user pressing down on a finger press sensor 262 of the wearable 3D IO and authenticator ring device 260 disposed beneath a curved surface high-sensitivity fingerprint and touch sensor pad unit 261 on interface surface platform 292 as a mouse click, touch detected by the high-sensitivity fingerprint and touch sensor pad unit 261 as joystick type input such as for a cursor, or swiping of a thumb across the curved-surface high-sensitivity fingerprint and touch sensor pad unit 261 as a scroll command, or other embodiments. In other example embodiments, user hand movement for hand gestures detected by the gyro inertial measurement unit 253 or an altimeter sensor or some combination detecting 3D movement of the wearable 3D IO and authenticator ring device 260 in three-dimensional space, or finger movement for finger gestures such as EMG measurement unit 264 as a muscle sensor to detect finger bending gesture for cursor or other mouse control functions in embodiments herein. In still another example embodiment, user hand gesture such as a drag and drop motion in which the user depresses the finger press sensor 262 disposed beneath the high-sensitivity fingerprint and touch sensor pad unit 261, which may be curved or flat, to grab an item, moves the wearable 3D IO and authenticator ring device 260 in 3D space to drag, and releases the finger press sensor 262 to release an item is also detected by the gyro inertial measurement unit 253, EMG measurement unit 264, or finger press sensor 262 and may correlate to a drag and drop command to transfer a file across graphic user interface windows or between paired devices.

The user engagement profile 251 set for the information handling system 200 may then be transmitted to and stored with the user engagement profiles 274 stored at the wearable 3D IO and authenticator ring device 260. In other embodiments, the wearable 3D IO and authenticator ring device 360 may include additional user engagement profiles 274 set for smart devices or other information handling systems 200. The information handling system 200 may execute the wearable 3D IO and authenticator ring device management system 260 may be used to set the one or more outputs of sensors of the wearable 3D IO and authenticator ring device 260, such as high-sensitivity fingerprint and touch sensor pad unit 261, finger press sensor 262, gyro inertial measurement unit 253, EMG measurement unit 264, or microphone 278 to correlate with one or more input commands for the other paired smart device or for other information handling systems 200 in additional user engagement profiles 251 embodiments herein. These additional user engagement profiles 251 may be transmitted to and stored with the user engagement profiles 274 stored at the wearable 3D IO and authenticator ring device 260 as well.

As another example, the hardware processor 202 of the information handling system 200 may execute code instructions 214 of the wearable 3D IO and authenticator ring device management system 250 to generate a paired devices credentials profile 252 for the smart device or for the information handling system 200 itself. Such a paired devices credentials profile 252 for the smart device or for the information handling system 200 may be based on user input received via the information handling system 200 GUI to identify the smart device or information handling system 200 type and define a distance from the smart device or information handling system 200 at which the user wishes the wearable 3D IO and authenticator ring device 260 to become a controlling input device for the smart device or information handling system 200, as described in greater detail above with respect to FIG. 1. Further, the required authentication, such as any biometric inputs required, for pairing may be defined in paired devices credentials profile 252 for the various smart device or for the information handling system 200 itself. These paired devices credentials profiles 252 may be transmitted to and stored with the paired device credentials profiles 275 stored at the wearable 3D IO and authenticator ring device 260 as well.

The hardware processor 202 of the information handling system 200 may also execute code instructions 214 of the wearable 3D IO and authenticator ring device management system 250 to generate a user authentication and security profile 253 for the paired smart device or information handling system 200. The required authentication, such as any biometric inputs required, for post-pairing engagement may be defined in user authentication and security profile 253 for the various smart device or for the information handling system 200 itself. Such a user authentication and security profiles 253 for the smart device or for the information handling system 200 may be based on user input received via the information handling system 200 GUI to define rules of automatic login, virtual private network (VPN) access, or content access to the information handling system 200 or paired smart device via the wearable 3D IO and authenticator ring device 260 when in range and when out of range. For example, the user authentication and security profile 253 may set the wearable 3D IO and authenticator ring device 260 to automatically login to the information handling system 200 or smart device, to log in in an administrator mode, or for VPN access when within range of the information handling system 200 or smart device (as defined within the paired devices credentials profile 252) by automatically transmitting any needed user credentials from the wearable 3D IO and authenticator ring device 260 to the information handling system 200, via the wireless interface adapter 280, or to a smart device upon the wearable 3D IO and authenticator ring device 260 authenticating the user through various onboard sensors, such as high-sensitivity fingerprint and touch sensor pad unit 261 with biometric fingerprint detection and user presence thermal or capacitive sensor user presence detector 265, and upon the wearable 3D IO and authenticator ring device 260 coming within the user-defined range of the information handling system 200 or smart device. As another example, the user authentication and security profile 253 may define specific secure content stored on the information handling system 200 or smart device that may only be viewed when the wearable 3D IO and authenticator ring device 260 has authenticated the user through various onboard sensors 261 and 265 and upon the wearable 3D IO and authenticator ring device 260 coming within the user-defined range of the information handling system 200 or smart device. Further, the GPS unit 267 may detect a location that may be identified as secure or non-secure (such as a public location) in the user authentication and security profiles 253 to set when logout or accessibility restrictions are applied or not when the wearable 3D IO and authenticator ring device 260 leaves range of an information handling system 200 or smart device or when repeat biometric authentication such as with a fingerprint may be required for access. These additional user authentication and security profiles 254 may be transmitted to and stored with the user authentication and security profiles 277 stored at the wearable 3D IO and authenticator ring device 260 as well.

These profiles may be generated at the information handling system 200 and transmitted to a wearable 3D IO and authenticator ring device agent 273 operating at the wearable 3D IO and authenticator ring device 260, via the wireless interface adapter 230 and antenna 236-1-1. These profiles may then be transmitted wirelessly and stored in memory 271 of the wearable 3D IO and authenticator ring device 260 as the user engagement profile 273, the paired devices credentials profile 275, and the user authentication and security profiles 277. The hardware microprocessor 270 at the wearable 3D IO and authenticator ring device 260 may then execute machine readable code instructions 272 of this wearable 3D IO and authenticator ring device agent 273 to manage interoperability between the wearable 3D IO and authenticator ring device 260 and previously paired smart devices or the information handling system 200 itself as the user moves within range of these devices in the future. Range may be determined at the wearable 3D IO and authenticator ring device 260 via a range finder, microphone 278, or wireless interface device 280 among other systems. For example, the wireless interface device 280 or wireless interface adapter 250 or a dongle may determine range via a beacon or pairing request transmission from the wearable 3D IO and authenticator ring device 280 or an acknowledgement based on a reflected signal to an information handling system 200 or another smart device. In some embodiments, RSSI detected between the wireless interface device 280 and wireless interface adapter 250 or a dongle at an information handling system 200 or a smart device may be used to determine a range. In another example embodiment, a wireless Wi-Fi or other radio protocol location system operating via the wireless interface device 280 may determine range distance between the wearable 3D IO and authenticator ring device 260 and an information handling system 200 or other smart device. Ultra-wide band system, sound detection via microphones, infrared, ultrasound systems or others may be used to determine range distance in other embodiments. In wireless system range finding, the information handling system 200 or other smart device would also need to be in wireless range of the wearable 3D IO and authenticator ring device 280 for radio signal exchange in embodiments herein. Further, a near field communication wireless system of the wireless interface adapter 280, capacitive sensor for 261, a GPS unit 267 or other range finder at the wearable 3D IO and authenticator ring device 280 may be used to determine a range in some other various embodiments herein.

The hardware processor 202 may also execute machine readable code instructions 214 of the wearable 3D IO and authenticator ring device management system 250 to generate a user thumb motion control machine learning model 253 that adjusts the input commands for the information handling system 200 or previously paired smart devices identified within the user engagement profile 251 based on specific characteristics of a specific user's movement or interaction with the high-sensitivity fingerprint and touch sensor pad unit 261 other various sensors 262, 263, 264, 267, or 268 of the wearable 3D IO and authenticator ring device 260. For example, some individual users may press the high-sensitivity fingerprint and touch sensor pad unit 261 with greater force than others, or conduct different finger displacement direction (such as from horizontal, tilted, or angled directions) for swipes, or use different swipe distances or speeds resulting in a need to tailor the wearable 3D IO and authenticator ring device 260 to a specific user in order to tune responsiveness for mouse cursor movements or differentiate between a hard press, which could be associated with a mouse right click, and a soft or regular press, which may be associated with a mouse left click. The high-sensitivity fingerprint and touch sensor pad unit 261, for example, may identify a hard press via software by reading that a greater proportion of the user's thumb (e.g., more surface area) is in contact with the high-sensitivity fingerprint and touch sensor pad unit 261 than when the user presses more lightly. As another example embodiment, the finger press sensor 262 situated at or under the high-sensitivity fingerprint and touch sensor pad unit 261 may register a greater force applied to it when the user is initiating a hard press than a soft press.

In another embodiment, users may perform thumb or finger touch interface with the high-sensitivity fingerprint and touch sensor pad unit 261 at varying levels of movement swipes across the curved surface of the high-sensitivity fingerprint and touch sensor pad unit 261 for cursor movement or other joystick type inputs. In yet another example, some users may perform more forceful or rapid gestures or hand movements than others which may correlate to movement of a cursor. The user thumb motion control machine learning model 253 in an embodiment may be trained at the information handling system 200, based on sensor readings taken at the wearable 3D IO and authenticator ring device 260 and transmitted to the information handling system 200 in order to adjust the touch swipe inputs or 3D gesture movement input commands for the information handling system 200 or previously paired smart devices identified within the user engagement profile 251 based on specific characteristics of a single user's touch swipe movement or 3D movements of the wearable 3D IO and authenticator ring device 260 interaction with the various sensors 261, 262, 263, 264, 267, or 268 of the wearable 3D IO and authenticator ring device 260. The wireless interface adapter 280 of the wearable 3D IO and authenticator ring device 260 in an embodiment may transmit recorded outputs of the sensors 261, 262, 263, 264, 267, or 268 to the information handling system for such training of the machine learning model 253 at the information handling system 200. In an embodiment, training may be executed at the information handling system 200 to utilize greater processing resources of the hardware processor 202. Upon completion of such training, the information handling system 200 in an embodiment may transmit a trained user thumb motion control machine learning model 276 to the wearable 3D IO and authenticator ring device 260 in the form of weight matrices for a multi-layer neural network, for example. In such a way, an information handling system may be used to establish the ways in which the wearable 3D IO and authenticator ring device may be used as a primary or controlling input device and security device, and tailored sensitivity for swipe movements or 3D motion inputs for accessing various smart devices and the information handling system 200 itself.

Following the initial pairing between the wearable 3D IO and authenticator ring device 260 and the information handling system 200, or one or more smart devices, the hardware microprocessor 270 may execute machine readable code instructions 272 of the wearable 3D IO and authenticator ring device agent 273 to activate upon detecting the presence of the user, authenticate the user, and interact with the previously paired information handling system 200 or other smart devices according to the profiles 274, 275, 277 and the user thumb motion control machine learning model 276. One or more sensors of the wearable 3D IO and authenticator ring device 260 in an embodiment may determine that a user is currently wearing the wearable 3D IO and authenticator ring device 260 and initiate the device. For example, the EMG measurement unit 264 may detect when the user's finger muscles are moving, indicating that the user is awake. As another example, the user presence thermal or capacitive sensor 265, such as a thermopile or capacitive sensor layer at the interior skin interface surface 293, may detect when the user's skin has come into contact with the interior skin interface surface 293 of the ring structure 291, indicating the user has donned the wearable 3D IO and authenticator ring device 260. The high-sensitivity fingerprint and touch sensor pad unit 261 may authenticate the user by matching the user thumbprint to a stored high-resolution thumbprint for an authorized user, for example. In another example, the microphone 278 may authenticate the user based on the user's voice pattern.

The wearable 3D IO and authenticator ring device 260 and the information handling system 200, or one or more smart devices, the hardware microprocessor 270 may execute machine readable code instructions 272 of the wearable 3D IO and authenticator ring device agent 273 to interact with the previously paired information handling system 200 or other smart devices according to the profiles 274, 275, 277 and the user thumb motion control machine learning model 276. For example, and as described in greater detail above with respect to FIG. 1, smart devices 171, 172, 173, or 174, or information handling system 200 may routinely transmit via WLAN a service set identifier (SSID) or beacon identifying itself to the wearable 3D IO and authenticator ring device 260, or vice versa. The specific method used may in some embodiments be set by the user within the paired devices credentials profile 252. User authorization credentials for accessing the information handling system 200 or smart devices in an embodiment may be transmitted within a periodically transmitted beacon (either from the information handling system 200, smart devices or from the wearable 3D IO and authenticator ring device 260), or may be transmitted as a response to such a beacon. Upon performance of such an operational pairing (as distinguished from an initial pairing) with a detected device 200, the user credentials stored within the user authentication and security profile 254 may be transmitted from the wearable 3D IO and authenticator ring device 260 to the information handling system 200 or other previously paired smart device via antenna 283 to establish the wearable 3D IO and authenticator ring device 260 as a primary or controlling input device for the smart device or information handling system 200. Any user credentials necessary for logging in the user as an administrator or granting the user access to secured files or VPN may also be transmitted in such a way.

The hardware processor 202 of the information handling system 200 in an embodiment may execute machine readable code instructions 214 of the wearable 3D IO and authenticator ring device management system 250 to grant administrator access or access to a virtual private network (VPN) to the wearable 3D IO and authenticator ring device 260 according to the stored user authentication and security profile 254 associated with the identified wearer. In such a way, the user of the wearable 3D IO and authenticator ring device 260 may move the wearable 3D IO and authenticator ring device 260 between and among various smart devices and information handling systems 200, and automatically establish the 3D IO and authenticator device 260 as a security and IO device for those various smart devices and information handling systems 200 as the user enters and leaves the ranges of those devices.

Once the wearable 3D IO and authenticator ring device 260 is operationally paired with the information handling system 200 or other smart device and the user has been authenticated both at the wearable 3D IO and authenticator ring device 260 and at the information handling system 200 or smart device, as described directly above, the wearable 3D IO and authenticator ring device 260 may transmit input commands to the operationally paired devices based on sensor inputs received at the wearable 3D IO and authenticator ring device 260. For example, the user of the wearable 3D IO and authenticator ring device in an embodiment may press or swipe a thumb across the high-sensitivity fingerprint and touch sensor pad unit 261, depress a finger press sensor 262, make movements or hand gestures sensed by the gyro inertial measurement unit 263, or provide voice input via the microphone 278. Any of these or other registered user inputs at the wearable 3D IO and authenticator ring device 260 may then be input into the user thumb motion control machine learning model 276.

The hardware microprocessor 270 in an embodiment may execute machine readable code instructions of the user thumb motion control machine learning model 276 to provide an input command for the operationally paired information handling system 200 or other smart device that correlates to the user inputs recorded through the various sensors 261, 262, 263, 267, or 268, for example. As described herein, the input commands correlating to the measurements taken at the various sensors 261, 262, 263, 267, or 268 may be defined or tuned based on the training of the user thumb motion control machine learning model 276 and on the user-provided input used to generate the user engagement profile 251. For example, the user engagement profile 251 for the information handling system 200 itself or for a paired smart device may define a user pressing down on a finger press sensor 262 of the wearable 3D IO and authenticator ring device 260 disposed beneath a curved surface high-sensitivity fingerprint and touch sensor pad unit 261 as a mouse click, movement of the wearable 3D IO and authenticator ring device 260 in three-dimensional space as movement of a cursor in 3D space, or swiping of a thumb across the curved-surface high-sensitivity fingerprint and touch sensor pad unit 261 as a joystick-type movement input or a scroll command. The wireless interface device 280 of the wearable 3D IO and authenticator ring device 260 may then transmit the identified input command for the paired smart device or the information handling system 200 that correlates to the sensor measurements to the paired smart device or information handling system 200, respectively. In such a way, the user of the wearable 3D IO and authenticator ring device 260 may move the wearable 3D IO and authenticator ring device 260 between and among various smart devices and information handling systems 200, and use the 3D IO and authenticator device 260 as an IO device for those various smart devices and information handling systems 200 as the user enters and leaves the ranges of those devices.

As described herein, the wearable 3D IO and authenticator ring device 260 in an embodiment may also provide security benefits. For example, the authentication and security profile 253 for the paired smart device or information handling system 200 may define rules of automatic login, virtual private network (VPN) access, or content access to the information handling system 200 or paired smart device that may require the wearable 3D IO and authenticator ring device 260 to be in range and be limited from access when out of range. More specifically, the user authentication and security profile 253 may set the wearable 3D IO and authenticator ring device 260 to automatically logout of the information handling system or smart device, logout of administrator mode, or inhibit VPN access when the wearable 3D IO and authenticator ring device 260 is out of range of the information handling system 200 or smart device (as defined within the paired devices credentials profile 252). As another example, the user authentication and security profile 253 may define specific secure content stored on the information handling system 200 or smart device that may only be viewed when the wearable 3D IO and authenticator ring device 260 has authenticated the user through various onboard sensors 261 and 265 and upon the wearable 3D IO and authenticator ring device 260 coming within the user-defined range of the information handling system 200 or smart device. The above security features may be regulated based on detection of the wearable 3D IO and authenticator ring device 260 coming within the user-defined range of the information handling system 200 or smart device at a secure or non-secure location, such as detected with the GPS unit 287 in some embodiments. Such security features for access security control may be overridden by manual logging into or other authentication with such smart devices or information handling systems 200 in other embodiments herein.

Upon operational pairing with the information handling system 200 or other smart device and the wearable 3D IO and authenticator ring device 260, the wireless interface adapter 280 in an embodiment may transmit the user authentication and security profile 277 to the operationally paired information handling system 200 or other smart device. The user authentication and security profile 277 may further include machine readable code instructions for execution by a processor 202 or other hardware processor of a smart device to institute the security measures described directly above, as stored within the user authentication and security profile 277 when the wireless link established between the wireless interface adapter 280 of the wearable 3D IO and authenticator ring device 260 and the wireless interface adapter 230 of the information handling system or other smart device has been severed. Thus, in an embodiment, the information handling system 200 or smart device may log the user out, cease access to a VPN, inhibit file transfer, disable voice commands, or lock access to secure content when the wearable 3D IO and authenticator ring device 260 is no longer detected within the user-defined range of the information handling system 200 or smart device, or when the wireless link established during operational pairing between the smart device or information handling system 200 and the wearable 3D IO and authenticator ring device 260 has been terminated. In such a way, the user of the wearable 3D IO and authenticator ring device may move the wearable 3D IO and authenticator ring device between and among various smart devices and information handling systems, and automatically and securely establish the 3D IO and authenticator device as a security device for those various smart devices and information handling systems as the user enters and leaves the ranges of those devices.

Figure 3B:
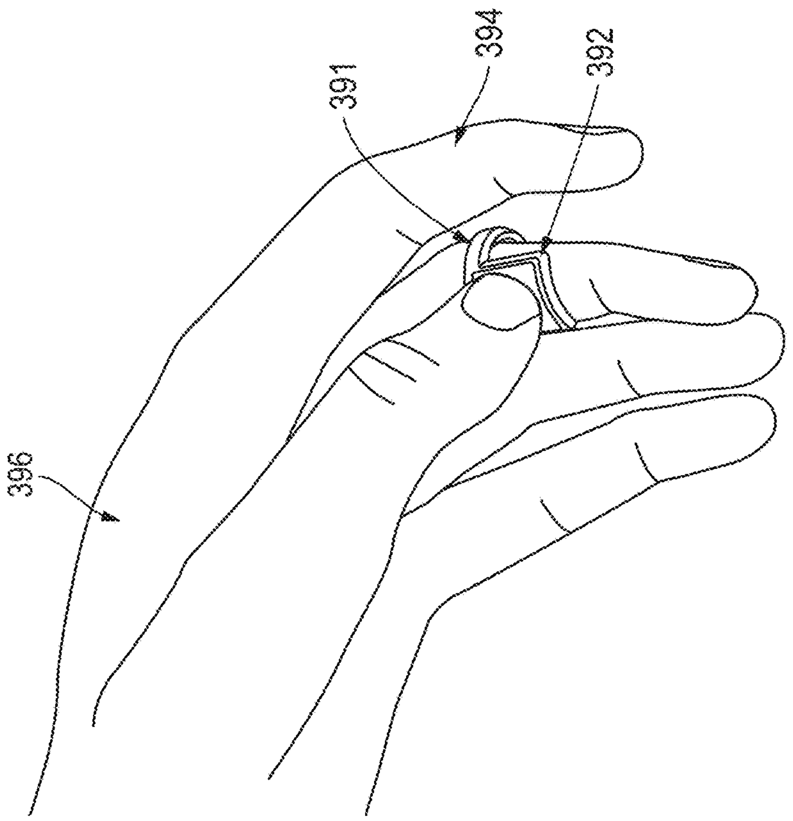
FIG. 3B is a graphical diagram illustrating a wearable 3D IO and authenticator ring device worn by a user on a middle finger of a single hand for interaction between the user's thumb and a curved-surface fingerprint sensor according to an embodiment of the present disclosure.
Figure 3A:
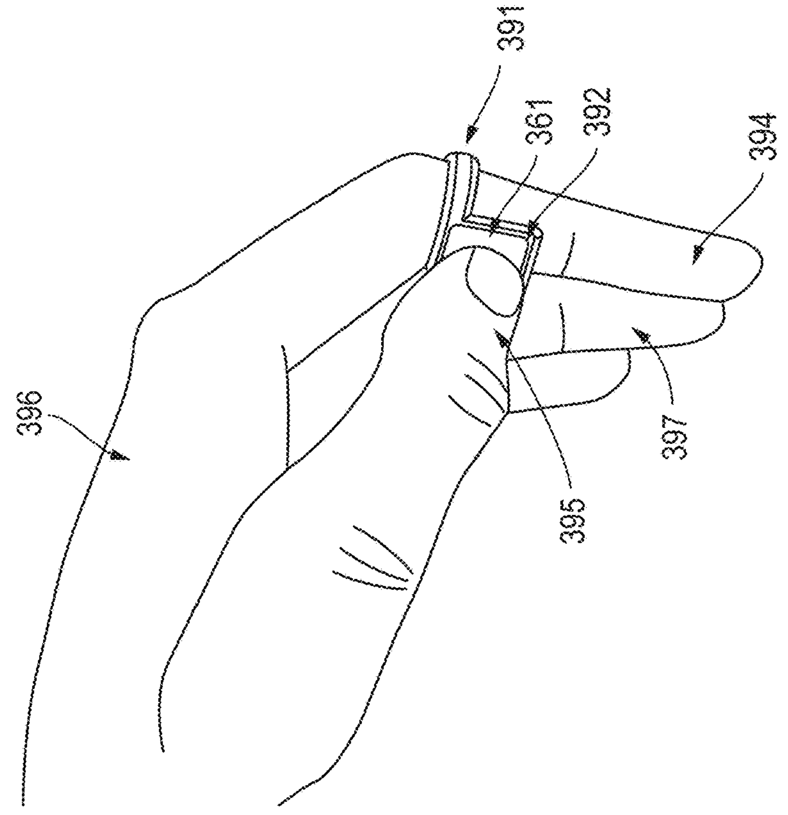
FIG. 3A is a graphical diagram illustrating a wearable 3D IO and authenticator ring device worn by a user on an index finger of a single hand for interaction between the user's thumb and a curved-surface fingerprint sensor according to an embodiment of the present disclosure.

FIG. 3A is a graphical diagram illustrating a wearable 3D IO and authenticator ring device worn by a user on an index finger of a single hand for interaction between the user's thumb and a curved-surface fingerprint sensor to allow the wearable 3D IO and authenticator ring device to act as an IO device for a paired smart device or information handling system. The wearable 3D IO and authenticator ring device 360 in an embodiment may be worn as a ring via a ring structure 391 on a user's finger 394, such as an index finger, and an interface surface platform 392 with a fingerprint and touchpad sensor unit 361 situated toward the user's thumb 395 on the same hand 396 as the user's finger 394 for receiving user input. The interface surface platform 392 with the fingerprint and touch sensor pad 361 may have a curved surface to wrap around the user's finger 394 and curve with the ring structure 391 in an embodiment. In other embodiments the interface surface platform 392 may be flat (not shown), but part of or operatively coupled to the ring structure 391. The interface surface platform 392 with the fingerprint and touch sensor pad 361 is situated for the user to interact with the curved-surface or flat fingerprint and touch sensor pad 361 using the thumb 395. In another embodiment, the wearable 3D IO and authenticator ring device 360 is rotated to have the interface surface platform 392 with the fingerprint and touch sensor pad 361 situated facing a second finger 397 and not the thumb 395 for the user to interact with the curved-surface or flat fingerprint and touch sensor pad 361 on finger 394 using second finger 397. That allows user to rub second finger 397 back and forth across fingerprint and touch sensor pad 361 on finger 394 for page swiping or scrolling without using the thumb in another embodiment. The curved-surface or flat fingerprint and touch sensor pad 361 in an embodiment may have a high-resolution fingerprint and touch sensor detector such as at 360 dots per inch, for example. For example, a low-power curved or flat FPS-Goodix sensor that is capacitive or ultrasonic ultrathin complementary metal-oxide semiconductor (CMOS) device may be installed as the fingerprint and touch sensor pad 361 on the interface surface platform 392 in some embodiments. As described in greater detail above with respect to FIG. 2, various positional sensors, such as gyro inertial measurement units or EMG measurement unit may be incorporated within the wearable 3D IO and authenticator ring device 360 to identify three-dimensional movement of the user's hand 396 as the user moves or gestures with that hand 396 or to detect finger gestures such as a user bending finger 394 for gesture control. For example, the gyro inertial measurement unit in the wearable 3D IO and authenticator ring device 360 may identify elevation or side to side movement for gestures relating to joystick-type or cursor control movements in some embodiments. Finger gestures such as a user bending finger 394 one or multiple times for a mouse click input or for selection inputs as a finger gesture control.

FIG. 3B is a graphical diagram illustrating a wearable 3D IO and authenticator ring device worn by a user on a middle finger of a single hand for interaction between the user's thumb and a curved-surface or flat surface high sensitivity fingerprint and touch sensor pad unit to allow the wearable 3D IO and authenticator ring device to act as an IO device for a paired smart device or information handling system. The wearable 3D IO and authenticator ring device 360 in an embodiment may be worn as a ring on a user's middle finger 397, or any other finger, in embodiments herein. The wearable 3D IO and authenticator ring device 360 has a ring structure 391 on a user's finger 397 and an interface surface platform 392 with a fingerprint and touch sensor pad unit 361 situated toward the user's thumb 395 on the same hand 396 as the user's finger 397 for receiving user input in one embodiment. The user's thumb 395 may press the fingerprint and touch sensor pad 361 from different angles, depending upon the finger on which the users places the wearable 3D IO and authenticator ring device 360 (e.g., index finger 394 or middle finger 397). This variability may be taken into consideration when training the user thumb motion control machine learning model to tailor received sensor inputs from the wearable 3D IO and authenticator ring device 360 to various input commands for paired smart devices or information handling systems, as described in greater detail above with respect to FIGS. 1 and 2. In other embodiments, the wearable 3D IO and authenticator ring device 360 is rotated on finger 397 to have the interface surface platform 392 with the fingerprint and touch sensor pad 361 situated facing a second finger 394 and not the thumb 395 for the user to interact with the curved-surface or flat fingerprint and touch sensor pad 361 on finger 397 using second finger 394. Any combination of fingers or the thumb are contemplated in various embodiments herein.

Figure 4:
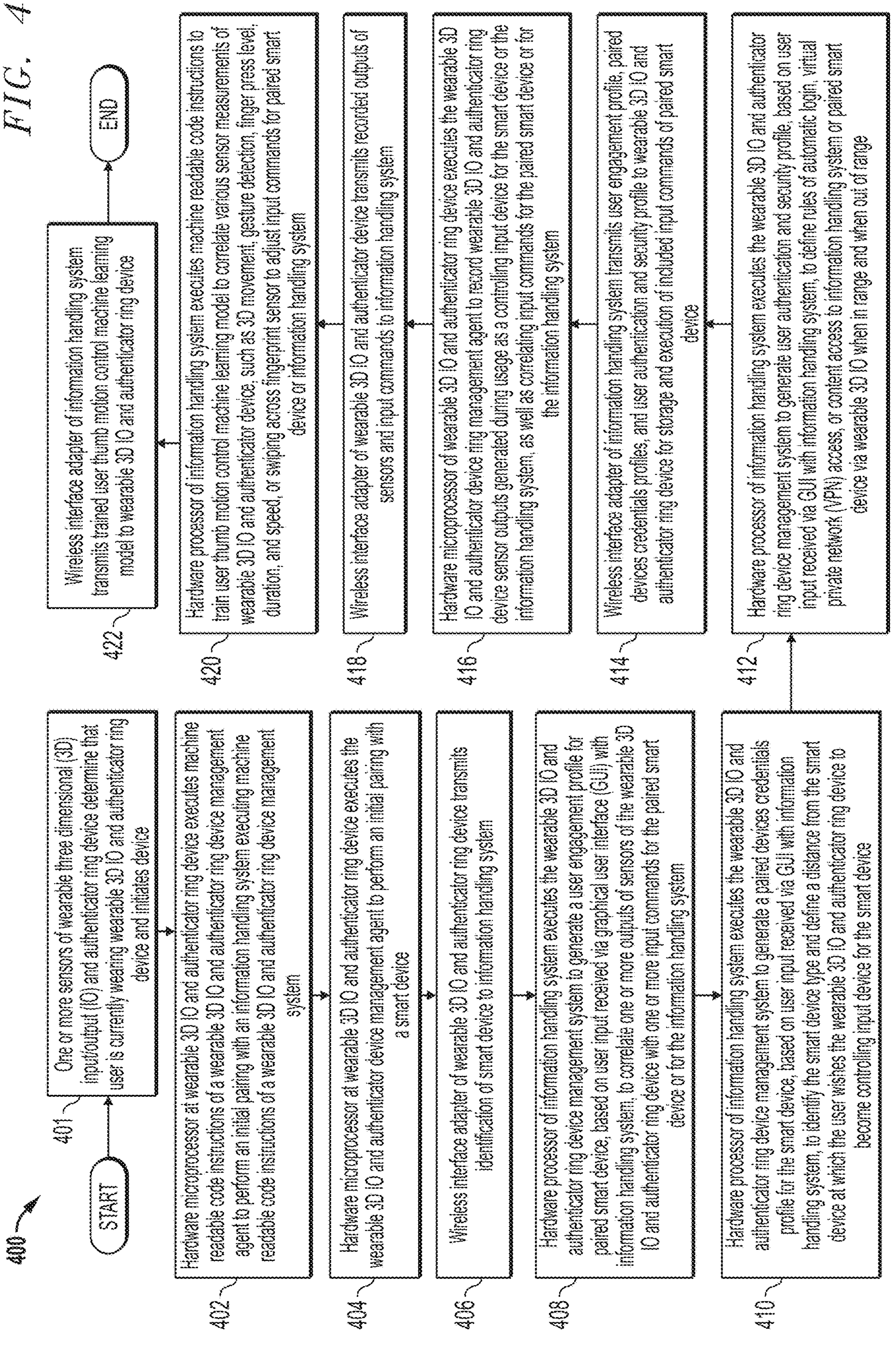
FIG. 4 is a flow diagram illustrating a method of establishing the wearable 3D IO and authenticator ring device as a security and IO device for accessing a smart device or information handling system according to an embodiment of the present disclosure.

FIG. 4 is a flow diagram illustrating a method of an initial pairing between a wearable three-dimensional (3D) input/output (IO) and authenticator ring device and an information handling system for establishing the wearable 3D IO and authenticator ring device as a controlling input device and security device for accessing various smart devices and the information handling system itself according to an embodiment of the present disclosure. As described herein, users of information handling systems often employ multiple IO devices to control their computers, smart devices, Internet of Things (IOT) devices, and smart appliances. For example, users may use a mouse for information handling systems such as computers, various remotes for smart devices such as smart televisions (TVs), or software applications on smart phones to control IOT sensors and appliances such as thermostats, smoke detectors, or washing machines. Further, some users may interact with a software application on their smart phones or within a graphical user interface (GUI) of their personal vehicles to operate various functionalities of those vehicles, including, for example, audio settings and media playback. This results in the user having to interact with several different IO devices (e.g., mouse, remote controls) and multiple software applications as the user goes about their day. The wearable 3D IO and authenticator ring device in an embodiment is a single device that travels with the user to act as a primary IO device for interacting with all of a user's various smart devices and information handling systems as the user wearing the device comes within range of those various smart devices and information handling systems throughout the day.

At block 401, one or more sensors of a wearable 3D IO and authenticator ring device in an embodiment may determine that a user is currently wearing the wearable 3D IO and authenticator ring device and initiate the device. For example, in an embodiment described with respect to FIG. 2, the user presence thermal or capacitive sensor 265 may detect when the user's skin has come into contact with the interior skin interface surface 293 of the ring structure 291, indicating the user has donned the wearable 3D IO and authenticator ring device 260.

Proceeding to block 402, a hardware microprocessor at a wearable three-dimensional (3D) input/output (IO) and authenticator ring device in an embodiment may execute machine readable code instructions of a wearable 3D IO and authenticator ring device management agent to perform an initial pairing with an information handling system executing machine readable code instructions of a wearable 3D IO and authenticator ring device management system. For example, in an embodiment described with respect to FIG. 1, such an initial pairing may be performed via a wireless link between the wearable 3D IO and authenticator ring device 160 and either the wireless interface adapter 130 or an operably connected wireless communication dongle 170 in various embodiments herein. In this way, the wearable 3D IO and authenticator ring device management agent on the wearable 3D IO and authenticator ring device 160 may coordinate with a wearable 3D IO and authenticator ring device management system 150 at an information handling system 100 to set user engagement profiles 151, paired devices credentials profiles 152, and user authentication and security profiles 154 for interaction with the information handling system 100 and any smart devices 171, 172, 173, or 174.

A hardware microprocessor at a wearable 3D IO and authenticator ring device in an embodiment at block 404 may execute machine readable code instructions of a wearable 3D IO and authenticator ring device management agent to perform an initial pairing with a smart device. As described herein, the ways in which the wearable 3D IO and authenticator ring device may interact with paired smart devices may be controlled according to various profiles generated at an information handling system based on user inputs provided via a graphical user interface (GUI). Prior to establishing such profiles, the wearable 3D IO and authenticator ring device may first perform an initial pairing with one or more smart devices, such as smart devices 171, 172, 173, or 174 in FIG. 1, to allow for establishing those profiles for each individual smart device to which the wearable 3D IO and authenticator ring device has been paired. Then settings may be adjusted in those smart device profiles via the information handling system.

At block 406, a wireless interface adapter of the wearable 3D IO and authenticator ring device in an embodiment may transmit an identification of the previously paired smart device to the previously paired information handling system. Such an identification of the previously paired smart device may prompt the previously paired information handling system to establish the various profiles that may dictate the ways in which the wearable 3D IO and authenticator ring device may interact with the smart device as a primary IO device for that smart device. This step may be performed for each smart device to which the wearable 3D IO and authenticator ring device performs the initial pairing described above with respect to block 404.

A hardware processor of the previously paired information handling system in an embodiment at block 408 may execute machine readable code instructions of the wearable 3D IO and authenticator ring device management system to generate a user engagement profile for the paired smart device, based on user input received via a graphical user interface (GUI) with the information handling system, to correlate one or more outputs of sensors of the wearable 3D IO and authenticator ring device with one or more input commands for the paired smart device or for the information handling system. This user engagement profile may be based on user input received via a graphical user interface (GUI) of the information handling system, to correlate one or more outputs of sensors of the wearable 3D IO and authenticator ring device with one or more input commands for the paired smart device or for the information handling system. For example, the user engagement profile for the information handling system itself or for a paired smart device may define a user pressing down on a curved-surface fingerprint sensor of the wearable 3D IO and authenticator ring device as a mouse click, movement of the wearable 3D IO and authenticator ring device as movement of a cursor in 3D space, or swiping of a thumb across the curved-surface fingerprint sensor as a two dimensional joystick type or a scroll command.

At block 410, a hardware processor of the previously paired information handling system in an embodiment may execute machine readable code instructions of the wearable 3D IO and authenticator ring device management system to generate a paired devices credentials profile for the smart device, based on user input received via the GUI with the information handling system, to identify the smart device type and define a distance from the smart device at which the user wishes the wearable 3D IO and authenticator ring device to become a controlling input device for the smart device. Such a paired devices credentials profile for the smart device or for the information handling system may be based on user input received via the information handling system GUI to identify the smart device or information handling system type and define a distance from the smart device or information handling system at which the user wishes the wearable 3D IO and authenticator ring device to become a controlling input device for the smart device or information handling system. For example, the paired devices credentials profile may set a distance of five feet as a range within which the wearable 3D IO and authenticator ring device may automatically become the primary or controlling IO mouse for an information handling system. As another example, the paired devices credentials profile may set a distance of twenty feet as a range within which the wearable 3D IO and authenticator ring device may automatically become the primary or controlling remote control for a smart television (TV). In yet another example, the paired devices credentials profile may set a distance of fifteen feet as a range within which the wearable 3D IO and authenticator ring device may automatically become the primary or controlling IO device for an IOT sensor. As yet another example, the paired devices credentials profile may set a distance of three feet as a range within which the wearable 3D IO and authenticator ring device may automatically become the primary or controlling IO device for a smart appliance, such as a smart washing machine. In still another example, the paired devices credentials profile may set a distance of one hundred feet as a range within which the wearable 3D IO and authenticator ring device may automatically become the primary or controlling IO device for a personal vehicle, such as a car.

A hardware processor of the information handling system in an embodiment at block 412 may execute machine readable code instructions of the wearable 3D IO and authenticator ring device management system to generate a user authentication and security profile, based on user input received via the GUI with the information handling system, to define rules of automatic login, virtual private network (VPN) access, or content access to the information handling system or the paired smart device via the wearable 3D IO when in range and when out of range of the smart device or the information handling system. Range distance determination may be assessed via wireless interface devices at either or both of the wearable 3D IO and authenticator ring device and the information handling system or paired smart device to exchange beacons or other wireless transmissions or to assess RSSI levels between the devices in an example embodiment. Other range determination techniques are contemplated according to embodiments herein. Such a paired devices credentials profile for the smart device or for the information handling system may be based on user input received via the information handling system GUI to define rules of automatic login, virtual private network (VPN) access, or content access to the information handling system or paired smart device via the wearable 3D IO when in range and when out of range. For example, the user authentication and security profile may set the wearable 3D IO and authenticator ring device to automatically login in administrator mode or for VPN access when within range of the information handling system or smart device (as defined within the paired devices credentials profile) by automatically transmitting any needed user credentials from the wearable 3D IO and authenticator ring device to the information handling system or smart device upon the wearable 3D IO and authenticator ring device authenticating the user through various onboard sensors and upon the wearable 3D IO and authenticator ring device coming within the user-defined range of the information handling system or smart device. As another example, the user authentication and security profile may define specific secure content stored on the information handling system or smart device that may only be viewed when the wearable 3D IO and authenticator ring device has authenticated the user through various onboard sensors and upon the wearable 3D IO and authenticator ring device coming within the user-defined range of the information handling system or smart device. Such security may be bypassed with direct authentication of an authorized user in embodiments.

At block 414, a wireless interface adapter of the information handling system may transmit the user engagement profile, paired devices credentials profile, and user authentication and security profile to the wearable 3D IO and authenticator ring device for storage and execution of included input command settings for user engagement, paired devices credentials, and security settings with the pre-paired smart device or the information handling system that is within range. These profiles may be accessed or enforced by a hardware microprocessor of the wearable 3D IO and authenticator ring device executing machine readable code instructions of a wearable 3D IO and authenticator ring device agent when the wearable 3D IO and authenticator ring device is in wireless communication with the previously paired smart device or information handling system in an embodiment. In some cases, information stored within these profiles (e.g., user credentials) or the entire profile (e.g., user authentication and security profile) may be transmitted to the smart device or information handling system with which the wearable 3D IO and authenticator ring device has an active wireless link in order to provide machine readable code instructions to the smart device or information handling system to execute when the wearable 3D IO and authenticator ring device is no longer in range of the smart device or information handling system and the wireless link has been severed. This may provide added layers of security.

A hardware microprocessor of the wearable 3D IO and authenticator ring device in an embodiment at block 416 may execute machine readable code instructions of the wearable 3D IO and authenticator ring device management agent to record wearable 3D IO and authenticator ring device sensor outputs generated during usage of the wearable 3D IO and authenticator ring device as a controlling input device for the smart device or the information handling system, as well as correlating input commands for the paired smart device or for the information handling system. For example, in an embodiment described with respect to FIG. 2, the user thumb motion control machine learning model 253 in an embodiment may be trained at the information handling system 200, based on sensor readings taken at the wearable 3D IO and authenticator ring device 260 and transmitted to the information handling system 200 in real time or upon wireless engagement with the information handling system after use in order to adjust the input command settings for the information handling system 200 or previously paired smart devices identified within the user engagement profile 251 based on specific characteristics of a single user's movement or interaction with the various sensors 261, 262, 263, 264, 267, or 268 of the wearable 3D IO and authenticator ring device 260.

At block 418, the wireless interface adapter of the wearable 3D IO and authenticator ring device in an embodiment may transmit recorded outputs of the sensors and input commands to the information handling system. For example, the wireless interface adapter 280 of the wearable 3D IO and authenticator ring device 260 in an embodiment may transmit current or recorded outputs of the sensors 261, 262, 263, 264, 267, or 268 to the information handling system for such training of the machine learning model 253 at the information handling system 200 with higher processing power and speed.

The hardware processor of the information handling system in an embodiment at block 420 may execute machine readable code instructions to train a user thumb motion control machine learning model to correlate various sensor measurements of the wearable 3D IO and authenticator ring device, such as duration, angle, speed, or distances of swiping across fingerprint sensor, 3D movement, gesture detection, finger press level, to adjust the input commands associated with those sensor measurements for the paired smart device or the information handling system. For example, the hardware processor 202 may execute machine readable code instructions 214 of the wearable 3D IO and authenticator ring device management system 250 to generate a user thumb motion control machine learning model 253 that adjusts the input commands for the information handling system 200 or previously paired smart devices identified within the user engagement profile 251 based on specific characteristics of a single user's movement or interaction with the various sensors 261, 262, 263, 264, 267, or 268 of the wearable 3D IO and authenticator ring device 260. For example, some individual users may swipe across the high-sensitivity fingerprint and touch sensor pad unit 261 with shorter duration movements, quicker speed, or shorter distances of swiping than others, resulting in a need to tailor the responsiveness of the high-sensitivity fingerprint and touch sensor pad unit 261 to a specific user in order to adjust for satisfactory responsive joystick type movement inputs, cursor movement, scroll operation or the like.

In another example, some individual users may press the high-sensitivity fingerprint and touch sensor pad unit 261 with greater force than others, resulting in a need to tailor the wearable 3D IO and authenticator ring device 260 to a specific user in order to differentiate joystick type control inputs or between a hard press, which could be associated with a mouse right click, and a soft or regular press, which may be associated with a mouse left click. The high-sensitivity fingerprint and touch sensor pad unit 261, for example, may identify a press by reading via software that a threshold proportion of the user's thumb (e.g., more surface area than for touch inputs) is in contact with the high-sensitivity fingerprint and touch sensor pad unit 261 than when the user touches more lightly for joystick-type, cursor, or scroll type movement inputs. The high-sensitivity fingerprint and touch sensor pad unit 261, in another example, may identify a hard press by reading that a greater proportion of the user's thumb (e.g., even more surface area) is in contact with the high-sensitivity fingerprint and touch sensor pad unit 261 than when the user presses more lightly for a soft press. As yet another example, the finger press sensor 262 may register a greater force applied to it when the user is initiating a hard press. In various example embodiments, users may perform varying forceful or rapid gestures or hand movements for gyro inertial measurement 3D gesture inputs than others which may correlate to movement of a cursor or other inputs.

At block 422, a wireless interface adapter of the information handling system in an embodiment may transmit the trained user thumb motion control machine learning model to the wearable 3D IO and authenticator ring device. The user thumb motion control machine learning model 253 in an embodiment may be trained at the information handling system 200, based on sensor readings taken at the wearable 3D IO and authenticator ring device 260 and transmitted to the information handling system 200 in order to adjust the input commands for the information handling system 200 or previously paired smart devices identified within the user engagement profile 251 based on specific characteristics of a single user's movement or interaction with the various sensors 261, 262, 263, 264, 267, or 268 of the wearable 3D IO and authenticator ring device 260. Upon completion of such training, the information handling system 200 in an embodiment may transmit a trained user thumb motion control machine learning model 276 to the wearable 3D IO and authenticator ring device 260 in the form of weight matrices for a multi-layer neural network, for example. In such a way, an information handling system may be used to establish the ways in which the wearable 3D IO and authenticator ring device may be used as a primary or controlling input device and security device for accessing various smart devices and the information handling system itself. The method for an initial pairing between a wearable three-dimensional (3D) input/output (IO) and authenticator ring device and an information handling system for establishing the wearable 3D IO and authenticator ring device as a controlling input device and security device for accessing various smart devices and the information handling system may then end.

Figure 5:
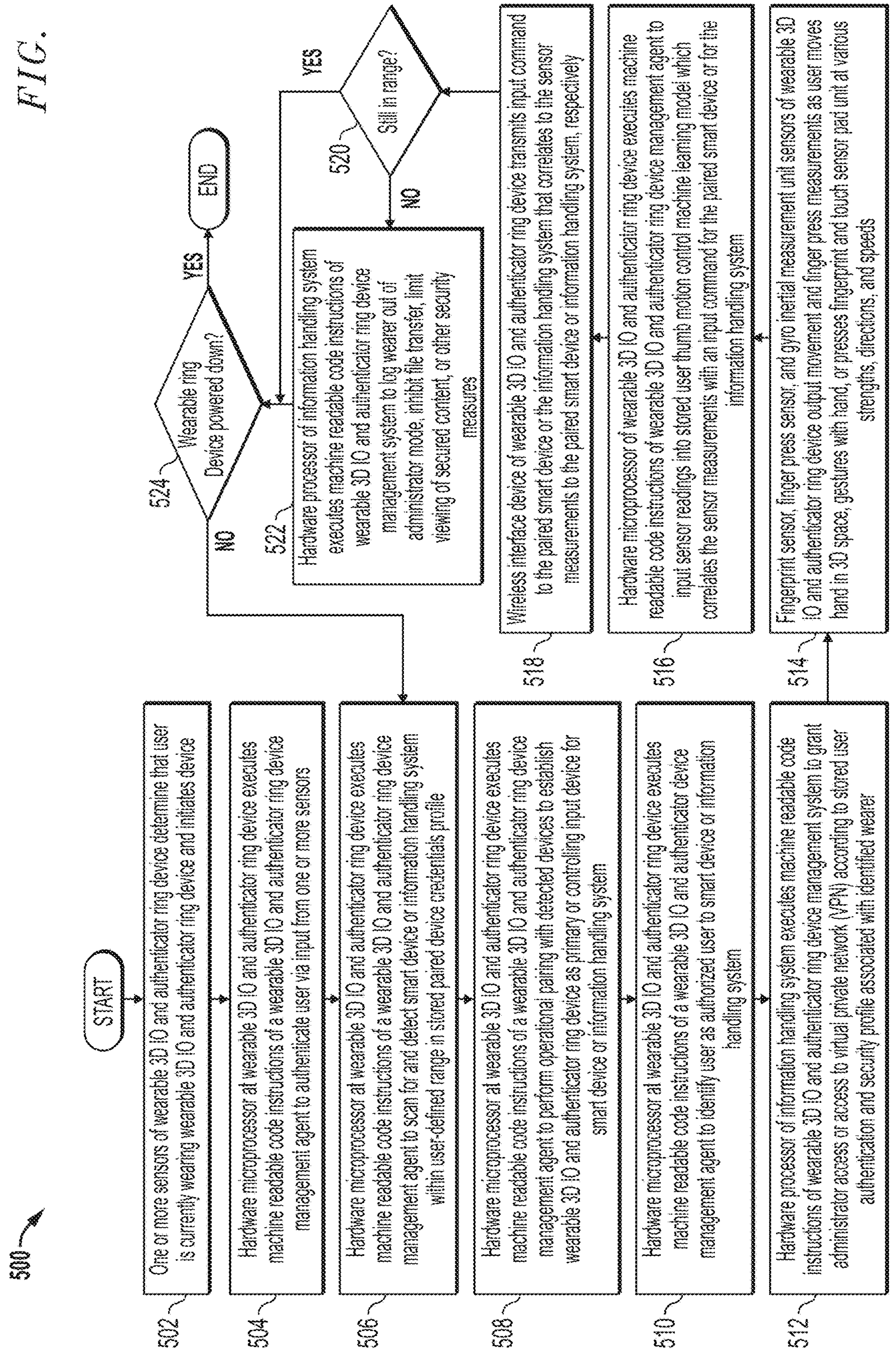
FIG. 5 is a flow diagram illustrating a method of automatically establishing a wearable 3D IO and authenticator ring device as a security and IO device for various smart devices and information handling systems according to an embodiment of the present disclosure.

FIG. 5 is a flow diagram illustrating a method of automatically establishing a wearable three-dimensional (3D) input/output (IO) and authenticator ring device as a security and IO device for various smart devices and information handling systems as a wearer of the wearable 3D IO and authenticator ring device enters and leaves user-defined ranges for those devices according to an embodiment of the present disclosure. As described herein, following the initial pairing between the wearable 3D IO and authenticator ring device and an information handling system, or one or more smart devices, the hardware microprocessor of the wearable 3D IO and authenticator ring device may execute machine readable code instructions of the wearable 3D IO and authenticator ring device agent to activate upon detecting the presence of the user, authenticate the user, and interact with the previously paired information handling system or other smart devices according to the profiles and the user thumb motion control machine learning model generated as described above with respect to FIG. 4.

At block 502, one or more sensors of a wearable 3D IO and authenticator ring device in an embodiment may determine that a user is currently wearing the wearable 3D IO and authenticator ring device and initiate the device. For example, in an embodiment described with respect to FIG. 2, the user presence thermal or capacitive sensor 265 may detect when the user's skin has come into contact with the interior skin interface surface 293 of the ring structure 291, indicating the user has donned the wearable 3D IO and authenticator ring device 260.

A hardware microprocessor at the wearable 3D IO and authenticator ring device in an embodiment at block 504 may execute machine readable code instructions of a wearable 3D IO and authenticator ring device management agent to authenticate the user via input from one or more sensors. For example, the high-sensitivity fingerprint and touch sensor pad unit 261 may authenticate the user by matching the user thumbprint to a stored high-resolution thumbprint for an authorized user, for example. In another example, the microphone 278 may authenticate the user based on the user's voice pattern.

At block 506, the hardware microprocessor at the wearable 3D IO and authenticator ring device in an embodiment may execute machine readable code instructions of the wearable 3D IO and authenticator ring device management agent to scan for and detect a previously paired smart device or information handling system within a user-defined range of the wearable 3D IO and authenticator ring device, as stored in a paired device credentials profile. For example, in an embodiment described with respect to FIG. 1, upon completion of the initial pairing, setting of the profiles 151, 152, 154, and training of the machine learning model 153 and transferring those settings to the wearable 3D IO and authenticator ring device 160, the wearable 3D IO and authenticator ring device 160 may begin to scan for previously paired smart devices 171, 172, 173, or 174 or information handling systems 100 with which to engage. For example, in one embodiment, smart devices 171, 172, 173, or 174, or information handling system 100 may routinely transmit via WLAN a service set identifier (SSID) identifying itself to the wearable 3D IO and authenticator ring device 160. In yet another example embodiment, the wearable 3D IO and authenticator ring device 160 may routinely transmit a Bluetooth® radio frequency (RF) pairing request to previously paired information handling systems 100 or smart devices 171, 172, 173, or 174 to establish a Bluetooth® wireless link. In yet another example embodiment, the wearable 3D IO and authenticator ring device 160 may routinely transmit a unique radio frequency (RF) beacon, and receive an acknowledgment response (ACK) from nearby previously paired devices 100, 171, 172, 173, or 174, as transmitted via radio 232 or via an operably coupled wireless communication dongle 170, which may include dongles for smart TVs such as an Amazon® Firestick®, or Roku® dongle.

User authorization credentials for accessing the information handling system 100 or smart devices 171, 172, 173, or 174 in an embodiment may be transmitted within a periodically transmitted Bluetooth® pairing request or beacon (either from the information handling system 100, smart devices 171, 172, 173, or 174, or from the wearable 3D IO and authenticator ring device 160), or may be transmitted as a response to such a Bluetooth® pairing request or beacon. In some cases, the user authorization credentials may only be transmitted upon confirmation that the information handling system 100 or smart devices 171, 172, 173, or 174 are identified within a previously stored paired devices credentials profile 152 for a previously paired smart device 171, 172, 173, or 174 or information handling system 100. In another aspect of an embodiment, the beacon or acknowledgment transmitted from the smart device 171, 172, 173, or 174 or information handling system 100 to the wearable 3D IO and authenticator ring device 160 may identify the device type (e.g., smart TV, IOT sensor, smart appliance, vehicle, computer) using a multi-digit code that correlates to a device type code stored within the paired devices credentials profile 152 associated with that device.

The hardware microprocessor at the wearable 3D IO and authenticator ring device in an embodiment at block 508 may execute machine readable code instructions of a wearable 3D IO and authenticator ring device management agent to perform an operational pairing with a detected device to establish the wearable 3D IO and authenticator ring device as a primary or controlling input device for the smart device or information handling system. For example, in an embodiment described with respect to FIG. 2, the wearable 3D IO and authenticator ring device 260 and the information handling system 200, or one or more smart devices, the hardware microprocessor 270 may execute machine readable code instructions 272 of the wearable 3D IO and authenticator ring device agent 273 to interact with the previously paired information handling system 200 or other smart devices according to the profiles 274, 275, 277 and the user thumb motion control machine learning model 276. User authorization credentials for accessing the information handling system 200 or smart devices in an embodiment may be transmitted within a periodically transmitted Bluetooth® pairing request or beacon (either from the information handling system 200, smart devices or from the wearable 3D IO and authenticator ring device 260), or may be transmitted as a response to such a Bluetooth® pairing request or beacon. Upon performance of such an operational pairing (as distinguished from an initial pairing) with a detected device 200 or smart devices that were previously initially paired, the user credentials stored within the user authentication and security profile 254 may be transmitted from the wearable 3D IO and authenticator ring device 260 to the information handling system 200 or other previously paired smart device via antenna 283 to establish the wearable 3D IO and authenticator ring device 260 as a primary or controlling input device for the smart device or information handling system 200. Any user credentials necessary for logging in the user as an administrator or granting the user access to secured files or VPN may also be transmitted in such a way. Any additional authorization credentials that may be required, such as when a long time duration has expired since last wireless contact by the wearable 3D IO and authenticator ring device 260 with an information handling system or smart device or a GPU unit 287 determines a user is in a non-secure location, may be easily provided with biometric authentication such as by fingerprint detection, voice recognition, other authorizing inputs (e.g., gestures pass codes) with the wearable 3D IO and authenticator ring device 260 according to embodiments herein.

At block 510, the hardware microprocessor at the wearable 3D IO and authenticator ring device in an embodiment may execute machine readable code instructions of the wearable 3D IO and authenticator ring device management agent to identify the user as an authorized user to the smart device or information handling system. Upon performance of the operational pairing with a detected device 200, the user credentials stored within the user authentication and security profile 254 may be transmitted from the wearable 3D IO and authenticator ring device 260 to the information handling system 200 or other previously paired smart device via antenna 283 to log the user into the smart device or information handling.

A hardware processor of the information handling system in an embodiment at block 512 may execute machine readable code instructions of a wearable 3D IO and authenticator ring device management system to grant authorized access, such as administrator access or access to a virtual private network (VPN), to the wearable 3D IO and authenticator ring device according to a stored user authentication and security profile associated with the identified wearer. Upon performance of the operational pairing with a detected device 200, the user credentials stored within the user authentication and security profile 254 may be transmitted from the wearable 3D IO and authenticator ring device 260 to the information handling system 200 or other previously paired smart device via antenna 283 to log in the user as an administrator or grant the user authorized access to the information handling system 200 or smart device, such as access to secured files or VPN. In some embodiments the user authentication and security profile 254 may be transmitted in its entirety from the wearable 3D IO and authenticator ring device 260 to the information handling system 200 or other smart device in order to provide instructions for execution at the information handling system 200 or other smart device in the case where the wearable 3D IO and authenticator ring device 260 moves out of range of the information handling system 200 or smart device and the wireless link between them is severed. In some embodiments, such security restrictions for access or logging out may be controlled when a GPS unit 287 determines that a user is in a non-secure location and some may not be instituted when a secure location is determined.

At block 514, a high-sensitivity fingerprint and touch sensor pad unit, finger press sensor, and gyro inertial measurement unit sensor of the wearable 3D IO and authenticator ring device in an embodiment may output touches, swipes, or presses the fingerprint sensor at various strengths, directions, and speeds, movement and finger press measurements as the user moves a hand in 3D space, or gestures with the hand. For example, the user of the wearable 3D IO and authenticator ring device in an embodiment may press or swipe a thumb across the high-sensitivity fingerprint and touch sensor pad unit 261, depress a finger press sensor 262, make movements or hand gestures sensed by the gyro inertial measurement unit 263 or GPS unit 267, or provide voice input via the microphone 278.

The hardware microprocessor of the wearable 3D IO and authenticator ring device in an embodiment at block 516 may execute machine readable code instructions of the wearable 3D IO and authenticator ring device management agent to input sensor readings into a stored user thumb motion control machine learning model which may correlate the sensor measurements with an input command for the paired smart device or for the information handling system. Any of the registered user inputs detected by the various sensors at block 514 above at the wearable 3D IO and authenticator ring device 260 may be input saved for training the user thumb motion control machine learning model 276 via uploading to user thumb motion control machine learning module 253 at the information handling system 200. The hardware microprocessor 270 in an embodiment may execute machine readable code instructions of the user thumb motion control machine learning model 276 to provide an input command for the operationally paired information handling system 200 or other smart device that correlates to the user inputs recorded through the various sensors 261, 262, 263, 267, or 268, for example. As described herein, the input commands correlating to the measurements taken at the various sensors 261, 262, 263, 267, or 268 may be tuned, adjusted or further defined based on the training of the user thumb motion control machine learning model 276 and on the user-provided input used to generate the user engagement profile 251. For example, the user engagement profile 251 for the information handling system 200 itself or for a paired smart device may define sensitivity of a user's thumb or finger touching or swiping the curved surface high-sensitivity fingerprint and touch sensor pad unit 261 for a joystick type input or scrolling command, a user pressing down on a finger press sensor 262 of the wearable 3D IO and authenticator ring device 260 disposed beneath a curved surface high-sensitivity fingerprint and touch sensor pad unit 261 as a mouse click, or movement of the wearable 3D IO and authenticator ring device 260 in three-dimensional space as movement of a cursor in 3D space.

At block 518, a wireless interface device of the wearable 3D IO and authenticator ring device may transmit the input command to the paired smart device or the information handling system that correlates to the sensor measurements detected at the wearable 3D IO and authenticator ring device as inputs to the paired smart device or information handling system, respectively. The wireless interface device 280 of the wearable 3D IO and authenticator ring device 260 may transmit the identified input command for the paired smart device or the information handling system 200 that correlates to those sensor measurements at the wearable 3D IO and authenticator ring device received as inputs within the user engagement profile to the paired smart device or information handling system 200, respectively. In such a way, the user of the wearable 3D IO and authenticator ring device 260 may operate the wearable 3D IO and authenticator ring device 260 for command inputs between and among various smart devices and information handling systems 200, and use the 3D IO and authenticator device 260 as an IO device for those various smart devices and information handling systems 200 as the user enters and leaves the ranges of those devices.

It may be determined in an embodiment at block 520 whether the operationally and currently paired smart device or information handling system is still within the user-defined range of the wearable 3D IO and authenticator ring device. As described herein, the wearable 3D IO and authenticator ring device 260 in an embodiment may also provide security benefits. For example, the user authentication and security profile 253 may set the wearable 3D IO and authenticator ring device 260 to automatically logout of administrator mode or inhibit VPN access when the wearable 3D IO and authenticator ring device 260 is out of range of the information handling system 200 or smart device (as defined within the paired devices credentials profile 252). As another example, the user authentication and security profile 253 may define specific secure content stored on the information handling system 200 or smart device that may only be viewed when the wearable 3D IO and authenticator ring device 260 has authenticated the user through various onboard sensors 261 and 265 and upon the wearable 3D IO and authenticator ring device 260 coming within the user-defined range of the information handling system 200 or smart device. If the wearable 3D IO and authenticator ring device is still within the user-defined range of the operationally paired smart device or information handling system at block 520, this may indicate that the user is still using the smart device or information handling system and that system is still powered on, and the method may proceed to block 524 to determine whether the wearable 3D IO and authenticator ring device has been powered down or enters a sleep mode. If the wearable 3D IO and authenticator ring device is no longer within the user-defined range of the operationally paired smart device or information handling system, this may indicate that the user is no longer using the smart device or information handling system, and the method may proceed to block 522 to trigger one or more security measures to secure the smart device or information handling system.

At block 522, in an embodiment in which the wearable 3D IO and authenticator ring device is no longer within the user-defined range of the operationally paired smart device or information handling system, a hardware processor of the information handling system may execute machine readable code instructions of the wearable 3D IO and authenticator ring device management system or a hardware processing resource at the smart device to log the wearer out, exit an administrator mode, inhibit file transfer, limit viewing of secured content, or perform other security measures at the smart device or information handling system. As described herein, upon operational pairing with the information handling system 200 or other smart device and the wearable 3D IO and authenticator ring device 260, the wireless interface adapter 280 in an embodiment may transmit the user authentication and security profile 277 to the operationally paired information handling system 200 or other smart device. The user authentication and security profile 277 may further include machine readable code instructions for execution by a processor 202 or other hardware processing resource of a smart device to institute the security measures stored within the user authentication and security profile 277 when the wireless link established between the wireless interface adapter 280 of the wearable 3D IO and authenticator ring device 260 and the wireless interface adapter 230 of the information handling system or other smart device has been severed or the range has been exceeded based on wireless proximity determination, GPS, or other location determination. Thus, in an embodiment, the information handling system 200 or smart device may log the user out, cease access to a VPN, inhibit file transfer, disable voice commands, or lock access to secure content when the wearable 3D IO and authenticator ring device 260 is no longer detected within the user-defined range of the information handling system 200 or smart device, or when the wireless link established during operational pairing between the smart device or information handling system 200 and the wearable 3D IO and authenticator ring device 260 has been terminated. In such a way, the user of the wearable 3D IO and authenticator ring device may move the wearable 3D IO and authenticator ring device between and among various smart devices and information handling systems, and automatically and securely establish the 3D IO and authenticator device as a security device for those various smart devices and information handling systems as the user enters and leaves the ranges of those devices. For example, if the wearable 3D IO and authenticator ring device is moved to within range, the wearable 3D IO and authenticator ring device operates as a mouse or other IO device that controls various information handling systems or smart devices depending on via proximity. For example, if the user is in front of a first information handling system, the wearable 3D IO and authenticator ring device becomes the controlling mouse or IO device for the first information handling system. When the user moves to a second information handling system, the wearable 3D IO and authenticator ring device becomes the controlling mouse or IO device for the second information handling system, and so forth.

It may be determined at block 524 whether the wearable 3D IO and authenticator ring device is powered down or enters a sleep mode. If the wearable 3D IO and authenticator ring device is not powered down, the method may proceed back to block 506 to continue to scan for and detect any previously paired smart device or information handling system within the user-defined range of the wearable 3D IO and authenticator ring device. By repeating the loop between blocks 506 and 524 in such a way, the user of the wearable 3D IO and authenticator ring device may move the wearable 3D IO and authenticator ring device between and among various smart devices and information handling systems, and automatically establish the 3D IO and authenticator device as a security and IO device for those various smart devices and information handling systems as the user enters and leaves the ranges of those devices.

For example, if the wearable 3D IO and authenticator ring device is moved to within range proximity of another information or smart device at 506, the wearable 3D IO and authenticator ring device may become the controlling input/output device, such as for mouse type input functions, for a new information handling system or smart device. Thus, the wearable 3D IO and authenticator ring device of embodiments herein is authorized to control various information handling systems or smart devices as a single input/output device upon reaching within a proximity range of any of those information handling systems or smart devices in embodiments herein by following the steps 506 to 522 in embodiments herein.

If the wearable 3D IO and authenticator ring device is powered down, there may no longer be a need to establish the wearable 3D IO and authenticator ring device as a security or IO device, and the method may then end.

The blocks of the flow diagram of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those capable in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wearable three-dimensional (3D) input/output (IO) and authenticator ring device executing a wearable 3D IO and authenticator ring device management agent comprising:

a ring structure for placement around a first finger of a single hand of a user;

a high-sensitivity fingerprint and touch sensor pad unit operatively coupled to an interface surface platform of the ring structure and situated for the user to interact with the high-sensitivity fingerprint and touch sensor pad unit using a second finger or thumb of the single hand;

a user presence and identification sensors in the ring structure to determine that the user has donned the wearable 3D IO and authenticator ring device on the first finger;

a hardware microprocessor to execute machine readable code instructions of the wearable 3D IO and authenticator ring device management agent to detect an information handling system is located within a user-defined range of the wearable 3D IO and authenticator ring device as determined from a paired device credentials profile;

a wireless adapter to perform an operational pairing with the detected information handling system to establish the wearable 3D IO and authenticator ring device as a controlling input device for the detected information handling system;

the high-sensitivity fingerprint and touch sensor pad unit to receive touch input correlating to an input command determined from a user engagement profile for the information handling system; and a wireless interface device to transmit the input command to the information handling system.

2. The wearable 3D IO and authenticator ring device of claim 1, wherein the high-sensitivity fingerprint and touch sensor pad unit has a sensor resolution of 360 dots per inch (DPI) on a curved-surface of the interface surface platform of the ring structure with fingerprint detection capability and capability to detect touch inputs for a cursor or selection tool.

3. The wearable 3D IO and authenticator ring device of claim 1, wherein the high-sensitivity fingerprint and touch sensor pad unit detects a finger press measurement via a size of a finger touch correlating to a mouse click input command.

4. The wearable 3D IO and authenticator ring device of claim 1 further comprising:

a gyro inertial measurement unit to detect a user hand movement or a user hand gesture moving the single hand wearing the wearable 3D IO and authenticator ring device in 3D space correlating to a gesture input command for the detected information handling system.

5. The wearable 3D IO and authenticator ring device of claim 1 further comprising:

a piezo or force sensor disposed below the high-sensitivity fingerprint and touch sensor pad unit on the interface surface platform of the ring structure to detect a finger press correlating to a mouse click or selection input command for the detected information handling system.

6. The wearable 3D IO and authenticator ring device of claim 1, wherein the high-sensitivity fingerprint and touch sensor pad unit or a piezo or force sensor disposed below the high-sensitivity fingerprint and touch sensor pad unit detects the finger press for the selection input command, a gyro inertial measurement unit detects a hand gesture drag motion for a movement input command, and the high-sensitivity fingerprint and touch sensor pad unit or a piezo or force sensor detects a release for a drop input command for a selected item.

7. The wearable 3D IO and authenticator ring device of claim 1 further comprising:

the hardware microprocessor to execute machine readable code instructions to input the detected touch input correlating to an input command, including level of finger displacement, swipe directionality, and press level of the touch input, into a trained user thumb motion control machine learning model to learn tuning settings for sensitivity of the high-sensitivity fingerprint and touch sensor pad unit for a user.

8. A method of secure accessing an information handling system via a wearable three-dimensional (3D) input/output (IO) and authenticator ring device comprising:

detecting a user presence with a user presence detector disposed within a ring structure of the wearable 3D IO and authenticator ring device for around a first finger of a single hand for a user;

detecting a user identification measurement from an identification sensor placed on or within an interface surface platform of the ring structure;

identifying the user based on the user identification measurements, via a hardware microprocessor executing machine readable code instructions of a wearable 3D IO and authenticator ring device management agent, as an authorized user for an information handling system located within a user-defined range of the wearable 3D IO and authenticator ring device as determined from a stored user authentication and security profile in a memory;

wirelessly pairing with the information handling system to establish a wireless link between the wearable 3D IO and authenticator ring device and the information handling system;

transmitting, via a wireless interface device, authorized user credentials to the information handling system for logging the user into the information handling system; and receiving a user touch input via a high-sensitivity fingerprint and touch sensor pad unit operatively coupled to the interface surface platform of the ring structure and situated for the user to interact with the high-sensitivity fingerprint and touch sensor pad unit using a thumb or a second finger of the single hand for a touch input command to the information handling system.

9. The method of claim 8, wherein the user authentication and security profile transmitted to the information handling system grants the user permission to transmit voice commands to the information handling system via a microphone of the wearable 3D IO and authenticator ring device.

10. The method of claim 8, wherein the user authentication and security profile transmitted to the information handling system grants the user permission to access the information handling system and access secure files at the information handling system depending on the user.

11. The method of claim 8, wherein the user authentication and security profile transmitted to the information handling system disables access to secure files at the information handling system when the wireless link is disabled with wearable 3D IO and authenticator ring device.

12. The method of claim 8, wherein the user authentication and security profile transmitted to the information handling system disables viewing of content at the information handling system when the wireless link is disabled with wearable 3D IO and authenticator ring device.

13. The method of claim 8, wherein the user presence detector is a user presence thermal or capacitive sensor disposed in the ring structure of the wearable 3D IO and authenticator ring device for around the first finger and the identification sensor is a fingerprint detection function of the fingerprint and touchpad sensor on the interface surface platform of the ring structure to detect a fingerprint for the user identification measurement.

14. The method of claim 8 further comprising:

detecting a finger press correlating to a mouse click or selection input command for the detected information handling system via a piezo or force sensor disposed below the high-sensitivity fingerprint and touch sensor pad unit or by assessing contact area of the finger on the high sensitivity fingerprint and touch sensor pad unit on the interface surface platform of the ring structure.

15. A wearable three-dimensional (3D) input/output (IO) and authenticator ring device executing a wearable 3D IO and authenticator ring device management agent comprising:

a ring structure for placement around a first finger of a single hand of a user;

a curved-surface high-sensitivity fingerprint and touch sensor pad unit operatively coupled to an interface surface platform of the ring structure and situated for the user to interact with the curved-surface high-sensitivity fingerprint and touch sensor pad unit using a second finger or thumb of the single hand;

a user presence and identification sensor in the ring structure to determine that the user has donned the wearable 3D IO and authenticator ring device on the first finger;

a memory to store a paired credentials profile for wirelessly coupling the wearable 3D IO and authenticator ring device a plurality of wireless devices including an information handling system and a wireless smart device;

a hardware microprocessor to execute machine readable code instructions of the wearable 3D IO and authenticator ring device management agent to detect at least one of the plurality of wireless devices is located within a user-defined range of the wearable 3D IO and authenticator ring device for that at least one wireless device as determined from the paired device credentials profile;

a wireless adapter to perform an operational pairing with the at least one wireless device to establish the wearable 3D IO and authenticator ring device as a controlling input device for the at least one wireless device;

the curved-surface high-sensitivity fingerprint and touch sensor pad unit to receive touch input correlating to an input command determined from a user engagement profile specific to at least one wireless device; and a wireless interface device to transmit the input command to the at least one wireless device.

16. The wearable 3D IO and authenticator ring device of claim 15, wherein the curved-surface high-sensitivity fingerprint and touch sensor pad unit has fingerprint detection capability and capability to detect touch inputs for a cursor or selection tool.

17. The wearable 3D IO and authenticator ring device of claim 15 further comprising:

a gyro inertial measurement unit to detect a user hand movement or a user hand gesture moving the single hand wearing the wearable 3D IO and authenticator ring device correlating to a 3D gesture input command for the at least one wireless device.

18. The wearable 3D IO and authenticator ring device of claim 15 further comprising:

hardware microprocessor to execute machine readable code instructions of the wearable 3D IO and authenticator ring device management agent to detect a second wireless device of the plurality of wireless devices is located within a user-defined range of the wearable 3D IO and authenticator ring device for that second wireless device as determined from the paired device credentials profile;

a wireless adapter to perform an operational pairing with the second wireless device to establish the wearable 3D IO and authenticator ring device as the controlling input device for the second wireless device.

19. The wearable 3D IO and authenticator ring device of claim 15, wherein a user authentication and security profile grants the user permission to access the at least one wireless device and access secured files at the at least one wireless device wirelessly paired to the wearable 3D IO and authenticator ring device within range.

20. The wearable 3D IO and authenticator ring device of claim 15 further comprising:

the wireless interface device to transmit the user authentication and security profile to the information handling system to log the user out of the at least one wireless device when the wireless link is disabled.

* * * * *